US012407141B2

United States Patent

Fremrot et al.

(12) United States Patent
(10) Patent No.: US 12,407,141 B2
(45) Date of Patent: Sep. 2, 2025

(54) PLUGGABLE TERMINAL BLOCK SHORT CIRCUIT PREVENTION SYSTEM

(71) Applicant: Dell Products L.P., Round Rock, TX (US)

(72) Inventors: Per Henrik Fremrot, Novato, CA (US); Colin Montgomery, Mountain View, CA (US); Maunish Shah, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 218 days.

(21) Appl. No.: 18/326,578

(22) Filed: May 31, 2023

(65) Prior Publication Data

US 2024/0405489 A1 Dec. 5, 2024

(51) Int. Cl.
*H01R 24/38* (2011.01)
*H01R 13/59* (2006.01)
*H01R 105/00* (2006.01)

(52) U.S. Cl.
CPC ............. *H01R 24/38* (2013.01); *H01R 13/59* (2013.01); *H01R 2105/00* (2013.01); *H01R 2201/06* (2013.01)

(58) Field of Classification Search
CPC ................................ H01R 13/59; H01R 24/38
See application file for complete search history.

(56) References Cited

U.S. PATENT DOCUMENTS 7,306,484 B1 * 12/2007 Mahoney ............. H01R 24/542 439/578
2009/0305577 A1 * 12/2009 Bradford-Stagg ..... H01R 24/38 439/680
2011/0078346 A1 * 3/2011 O'Connor ............. H04L 49/351 710/63
2020/0067238 A1 * 2/2020 Byrne ................ H01R 13/6683

OTHER PUBLICATIONS

Degson (Aug. 2022). "15EDGKAM-3.81-XXP-1Y-100A&Z(H) Customer Drawing" [Drawing No. 200102343] (Year: 2022).*
Delock. (Jan. 2017). "Datasheet: Delock Adapter DC 2.1×5.5 mm female > Terminal Block 2 pin " [Item No. 65421] (Year: 2017).*
Degson (Year: 2022).*
Delock (Year: 2017).*

* cited by examiner

*Primary Examiner* — Scott Bauer
(74) *Attorney, Agent, or Firm* — Joseph Mencher

(57) ABSTRACT

A pluggable terminal block short circuit prevention system includes a pluggable terminal block having a computing device connector with positive and negative power sub-connectors that connect to a pluggable terminal block connector on a computing device. A power system connector is included on the pluggable terminal block and includes terminal block positive and negative power contacts that are coupled to the positive and negative power sub-connectors on the computing device connector, respectively. The power system connector couples to a power system via power cabling having a power cabling connector that includes power cabling connector positive and negative power contacts that are configured to engage the terminal block (Continued)

positive and negative power contacts when the power cabling connector is connected to the power system connector, with the power cabling connector preventing relative movement between the power cabling connector positive and negative power contacts.

20 Claims, 19 Drawing Sheets

PLUGGABLE TERMINAL BLOCK SHORT CIRCUIT PREVENTION SYSTEM

BACKGROUND

The present disclosure relates generally to information handling systems, and more particularly to preventing short circuits when using pluggable terminal blocks with information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, industrial computing devices such as edge gateway devices (e.g., the DELL® Edge Gateway 3200 available from DELL® Inc. of Round Rock, Texas, United States), may utilize pluggable terminal blocks to couple power systems to the industrial computing device to provide relatively low voltage Direct Current (DC) power to the industrial computing device. For example, conventional pluggable terminal blocks may include a terminal block chassis, a computing device connector that extends from the terminal block chassis and that is configured to connect to the industrial computing devices discussed above, and power wire couplings that are included on the terminal block chassis and that are configured to accept power wires (a positive wire, a negative wire, and a ground wire) that are coupled to a power system. The power wire couplings on the conventional pluggable terminal block include respective power wire contacts that are configured to engage partially exposed portions of the power wires (i.e., portions of the power wires that are not completely covered by insulating material) to couple the power wires to the computing device connector on the pluggable terminal block. The power wire couplings may be configured to secure the power wires to the conventional pluggable terminal block in a variety of manners including, for example, via the use of screw-in terminals, spring clamps, push-in terminals, and/or other securing mechanisms known in the art. Following the securing of power wires to the conventional pluggable terminal block, the computing device connector on the pluggable terminal block may then be connected to terminal block connectors on industrial computing devices like those discussed above. The utilization of such conventional pluggable terminal blocks can raise some issues.

For example, incomplete insertion of the power wires into the power wire couplings on conventional pluggable terminal blocks and/or stress on the power wires connected to conventional pluggable terminal blocks may expose the exposed portion of the power wires, and in some cases can result in the power wires be disconnected from the conventional pluggable terminal blocks. As will be appreciated by one of skill in the art in possession of the present disclosure, the exposure and/or disconnection of power wires connected to conventional pluggable terminal blocks may cause a short circuit that can result in smoke, arcing, and/or other issues that can damage the computing device and/or power system to which they are connected, and/or present issues with the environments in which they are located (e.g., "magic" smoke created by a short circuit can contaminate a clean room environment and may be very costly to remedy).

Accordingly, it would be desirable to provide a pluggable terminal block system that addresses the issues discussed above.

SUMMARY

According to one embodiment, a pluggable terminal block short circuit prevention system includes a chassis; a processing system that is housed in the chassis; a pluggable terminal block connector that is coupled to the processing system and accessible on the surface of the chassis; and a pluggable terminal block including: a computing device connector that includes a computing device positive power sub-connector and a computing device negative power sub-connector, and that is connected to the pluggable terminal block connector; and a power system connector that is included on the pluggable terminal block and that includes a terminal block positive power contact that is coupled to the computing device positive power sub-connector, and a terminal block negative power contact that is coupled to the computing device negative power sub-connector, wherein the power system connector is coupled to a power system via power cabling having a power cabling connector that includes: a power cabling connector positive power contact that engages the terminal block positive power contact, and a power cabling connector negative power contact that engages the terminal block negative power contact, wherein the power cabling connector prevents relative movement between the power cabling connector positive power contact and the power cabling connector negative power contact.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
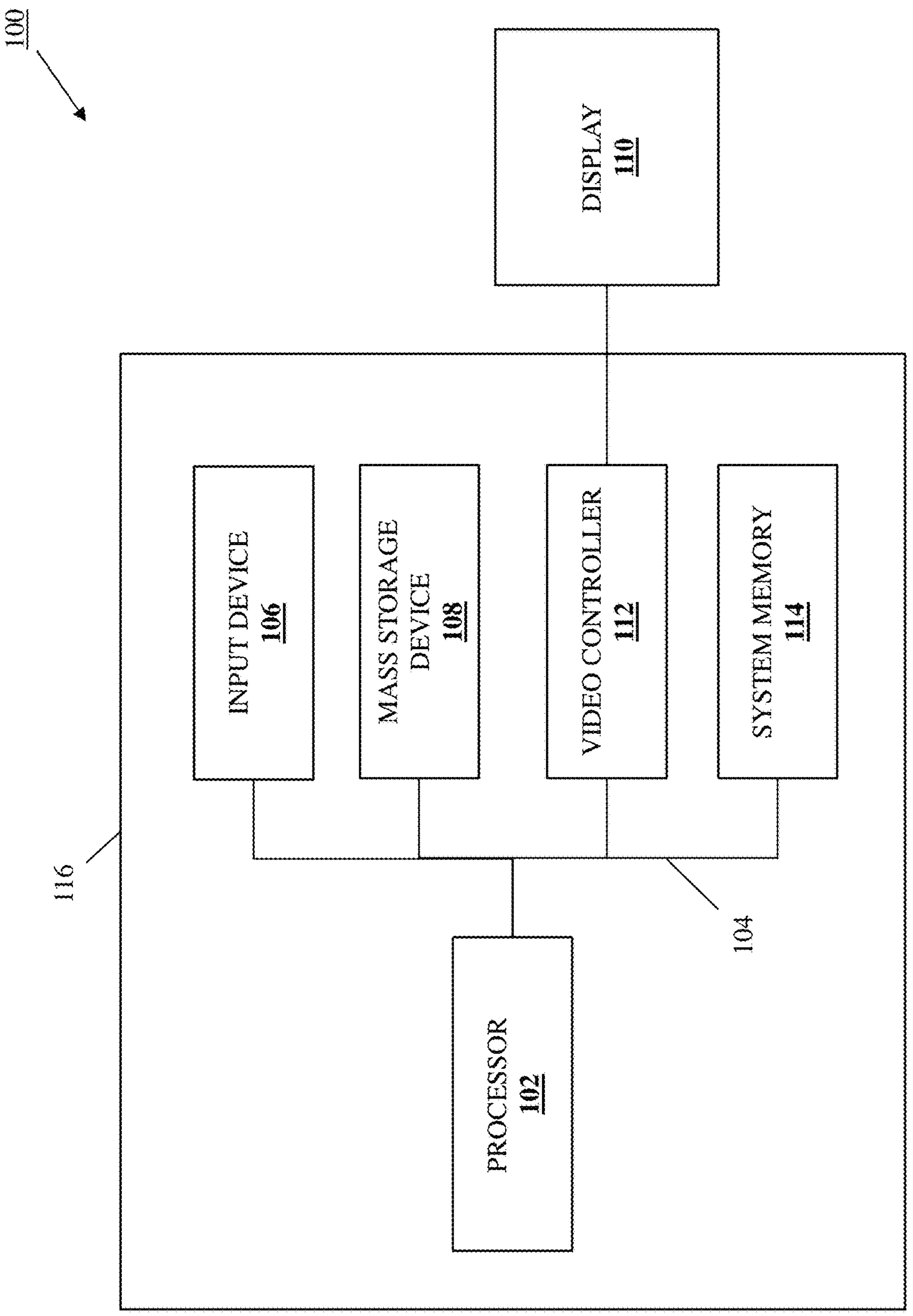
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
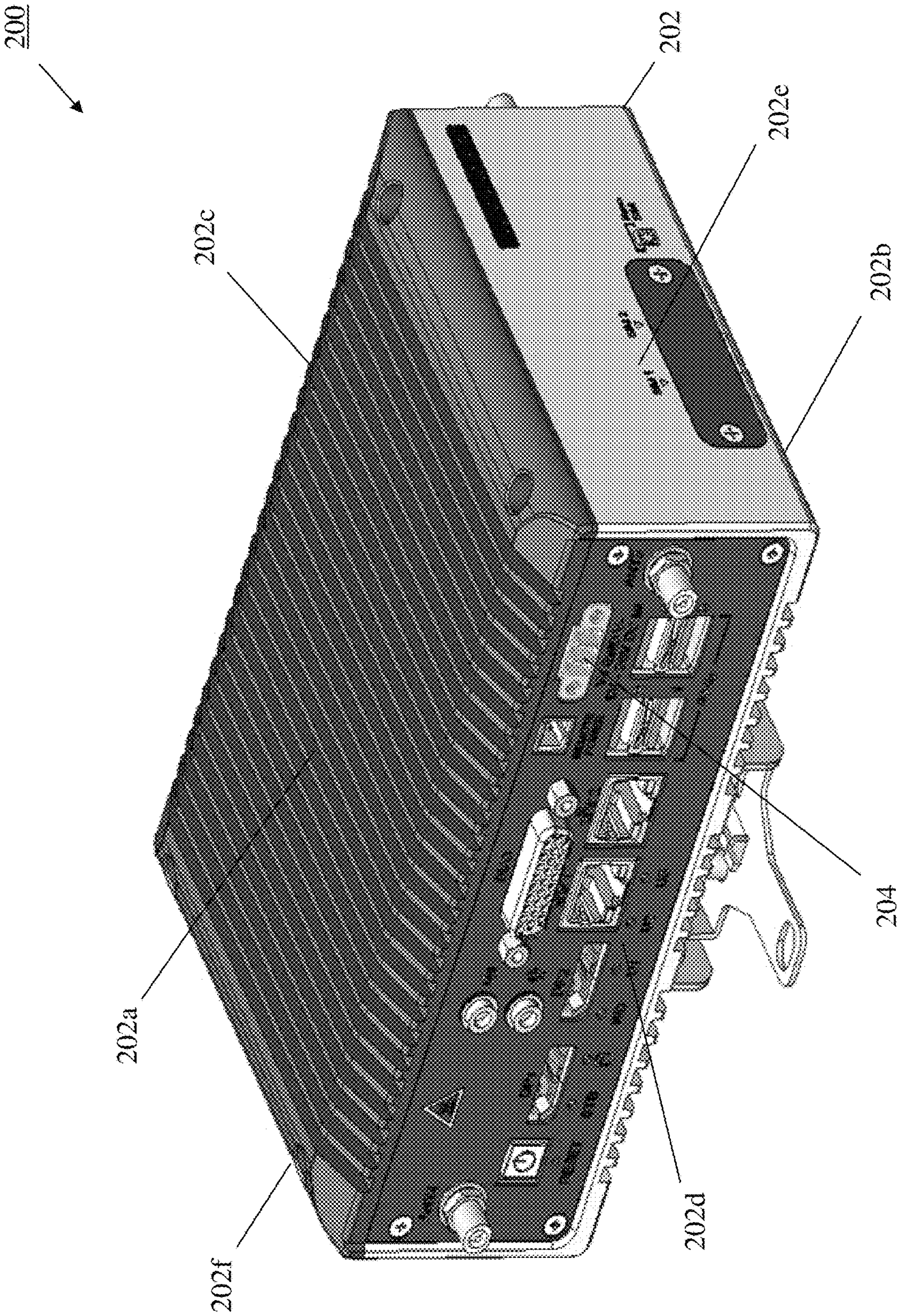
FIG. 2A is a perspective view illustrating an embodiment of a computing device that may be utilized with the pluggable terminal block short circuit prevention system of the present disclosure.

Referring now to FIG. 2A, an embodiment of a computing device 200 is illustrated that may be utilized with the pluggable terminal block short circuit prevention system of the present disclosure. In an embodiment, the computing device 200 may be provided by the IHS 100 discussed above with reference to FIG. 1, and/or may include some or all of the components of the IHS 100, and in specific examples, may be provided by industrial computing devices such as edge gateway device (e.g., the DELL® Edge Gateway 3200 available from DELL® Inc. of Round Rock, Texas, United States), which one of skill in the art in possession of the present disclosure will appreciate provides an industrial computing device that is typically utilized in manufacturing scenarios to collect data, pre-process that data, and provide that data for storage (e.g., in a network or cloud connected storage system). However, while illustrated and discussed as being provided by a particular type of computing device 200, one of skill in the art in possession of the present disclosure will appreciate that the functionality of the computing device 200 discussed below may be provided by other devices that are configured to operate similarly as the computing device 200 and utilize pluggable terminal blocks to connect with power systems.

In the illustrated embodiment, the computing device 200 includes a chassis 202 that houses the components of the computing device 200, only some of which are illustrated and discussed below. For example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a computing device engine (not illustrated) that is configured to perform the functionality of the computing devices discussed below.

In the illustrated embodiment, the chassis 202 includes a top surface 202*a*, a bottom surface 202*b* that is located opposite the chassis 202 from the top surface 202*a*, a front surface 202*c* that extends between the top surface 202*a* and the bottom surface 202*b*, a rear surface 202*d* that is located opposite the chassis 202 from the front surface 202*c* and that extends between the top surface 202*a* and the bottom surface 202*b*, and a pair of side surfaces 202*e* and 202*f* that are located opposite one another on the chassis 202 and that each extend between the top surface 202*a*, the bottom surface 202*b*, the front surface 202*c* and the rear surface 202*d*. The chassis 202 may include a pluggable terminal block connector 204 that, in the illustrated embodiment, is located on the rear surface 202*d* and that is configured to connect a pluggable terminal block provided according to the teachings of the present disclosure.

Figure 2B:
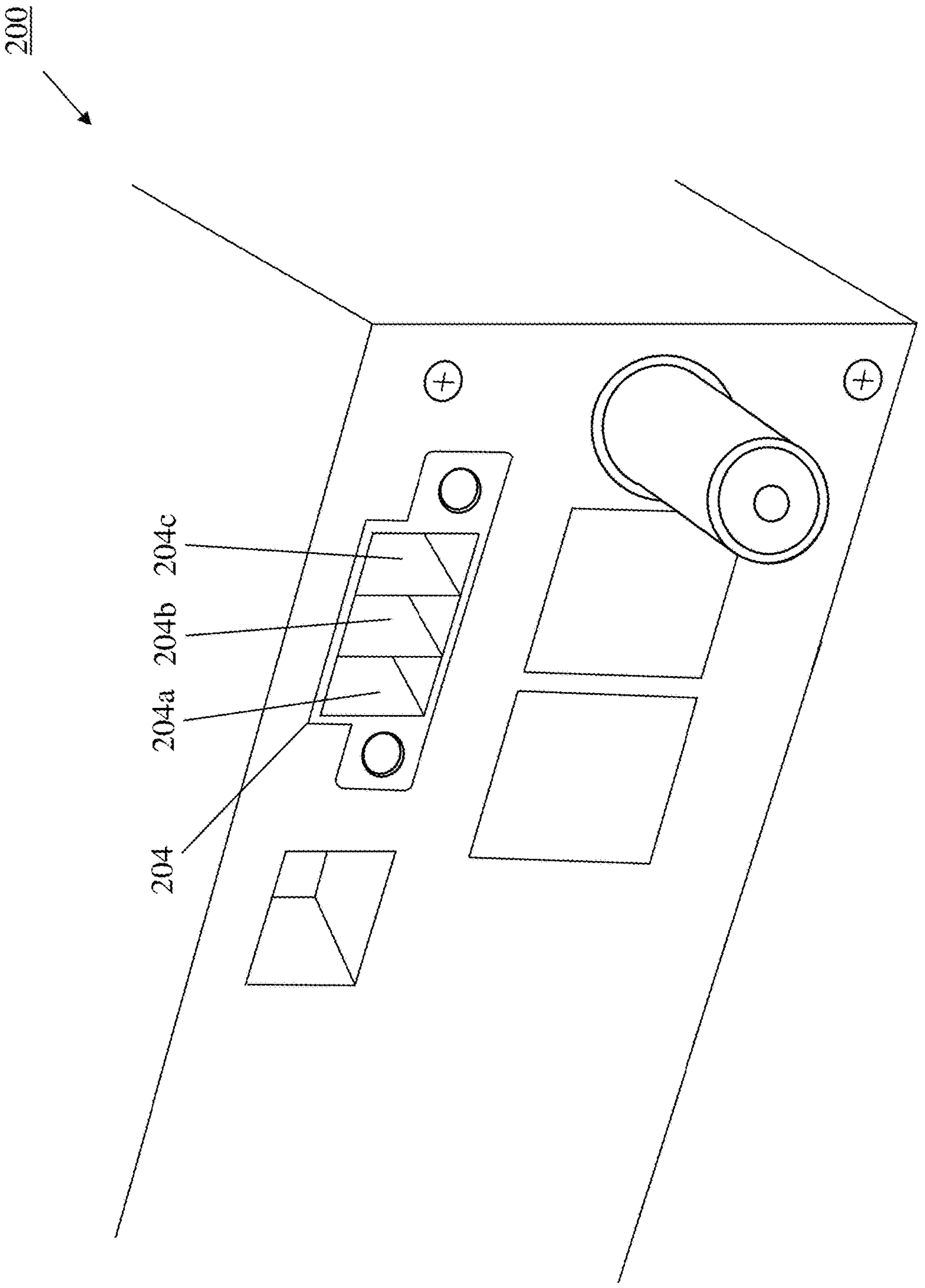
FIG. 2B is a perspective view illustrating an embodiment of a pluggable terminal block connector on the computing device of FIG. 2A.

With reference to FIG. 2B, in the illustrated embodiment, the pluggable terminal block connector 204 includes a positive power sub-connector 204*a*, a ground sub-connector 204*b*, and a negative power sub-connector 204*c*, although embodiments in which the pluggable terminal block connector 204 includes only a positive power sub-connector 204*a* and a negative power sub-connector 204*c* will fall within the scope of the present disclosure as well. Furthermore, while a specific configuration/order of the positive power sub-connector 204*a*, the ground sub-connector 204*b*, and the negative power sub-connector 204*c* is illustrated and described, one of skill in the art in possession of the present disclosure will appreciate how other configurations/ordering of the positive power sub-connector 204*a*, the ground sub-connector 204*b*, and/or the negative power sub-connector 204*c* will fall within the scope of the present disclosure as well. However, while a specific computing device that utilizes a pluggable terminal block provided according to the teachings of the present disclosure has been illustrated and described, one of skill in the art in possession of the present disclosure will appreciate how other devices may utilize a pluggable terminal block provided according to the teachings of the present disclosure while remaining within the scope of the present disclosure as well.

Figure 3A:
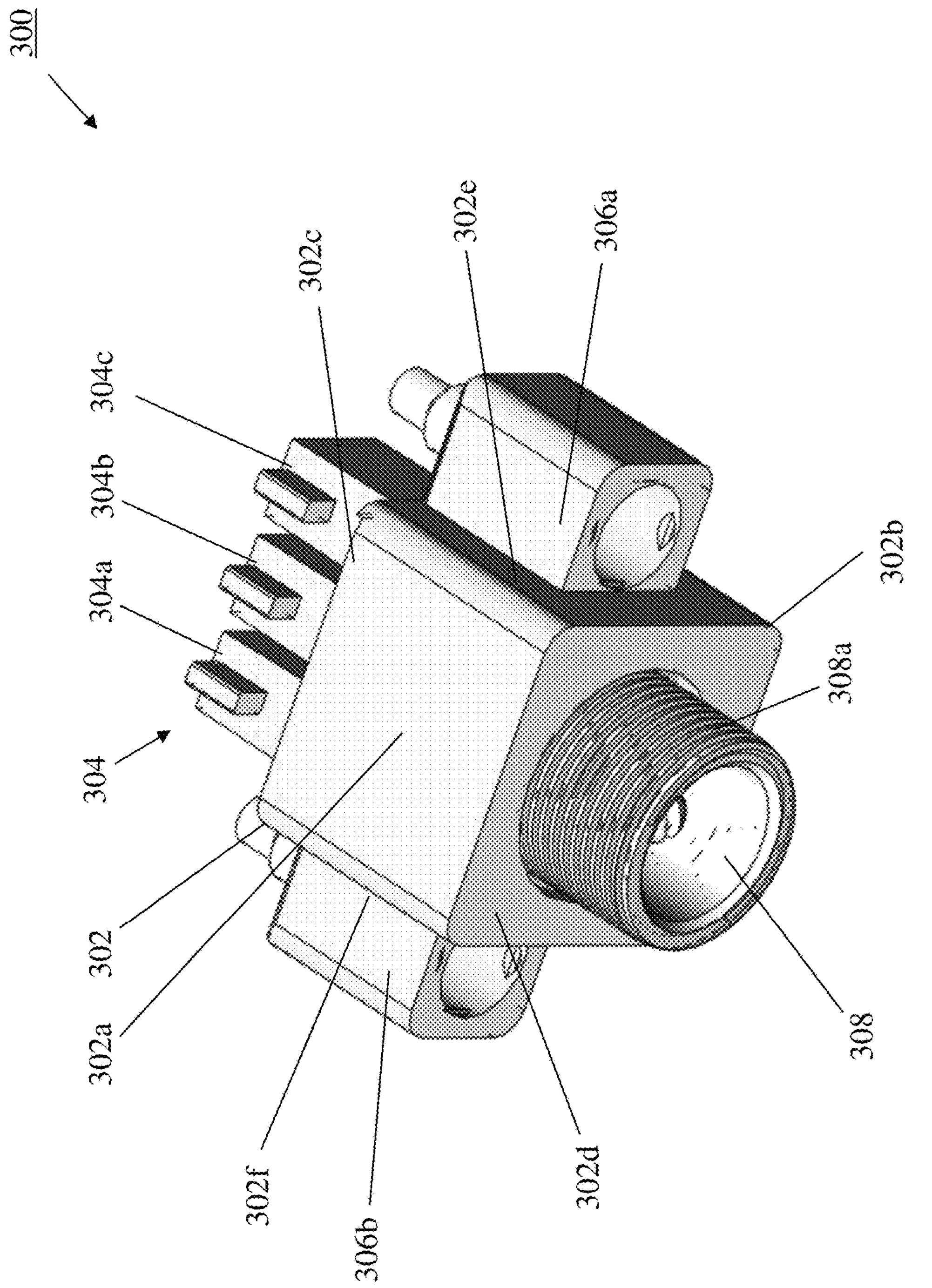
FIG. 3A is a perspective front view illustrating an embodiment of a pluggable terminal block utilized in the pluggable terminal block short circuit prevention system of the present disclosure.
Figure 3B:
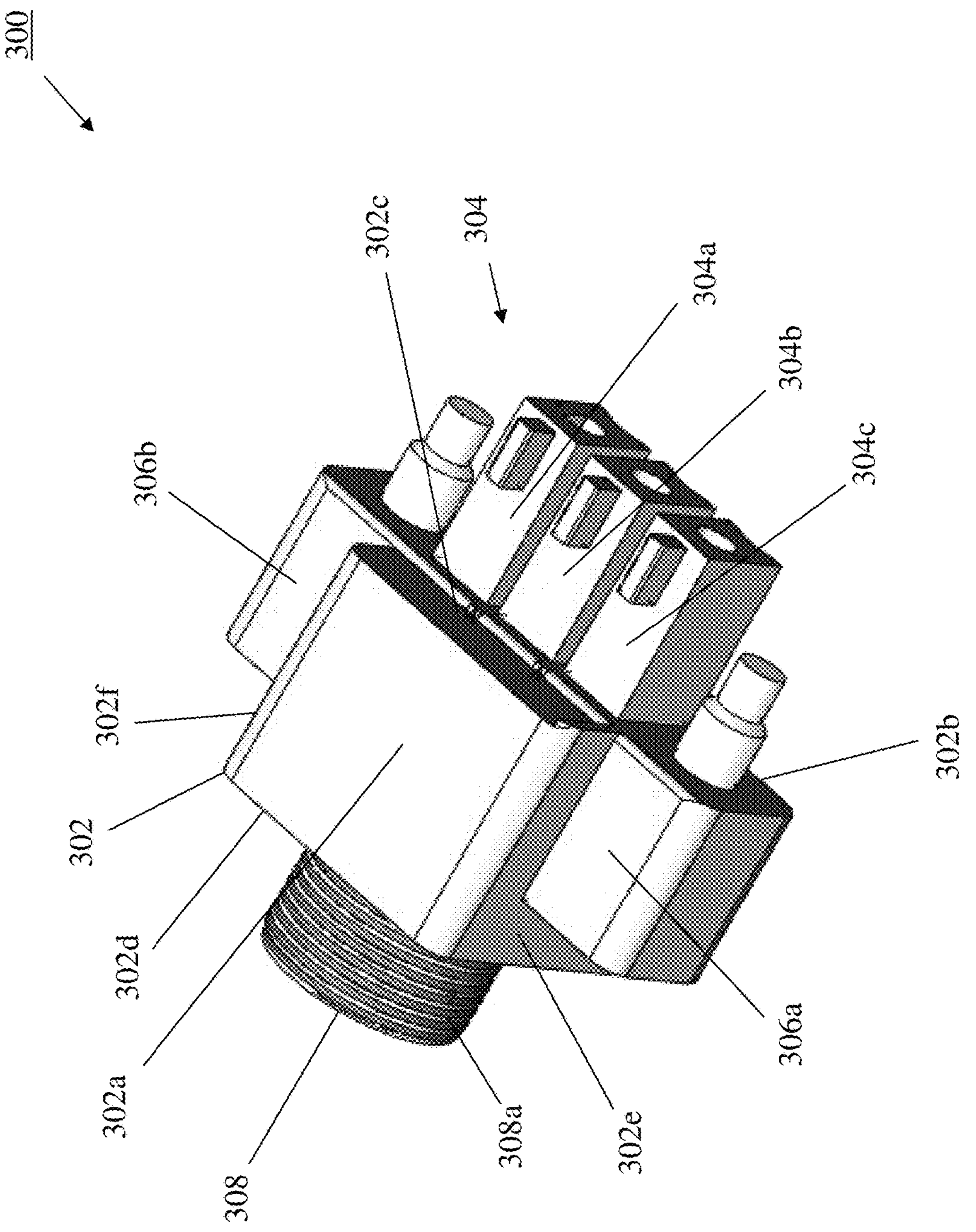
FIG. 3B is a perspective rear view illustrating an embodiment of the pluggable terminal block of FIG. 3A.

Referring now to FIGS. 3A and 3B, an embodiment of a pluggable terminal block 300 is illustrated that may be utilized in the pluggable terminal block short circuit prevention system of the present disclosure. As will be appreciated by one of skill in the art in possession of the present disclosure, the pluggable terminal block 300 provides a European-style terminal block (also referred to as a "Euroblock", "Eurostyle" connector, and a "PHOENIX®" connector) with a modified power connector, and may be used to couple power systems to industrial computing devices in order to provide relatively low voltage Direct Current (DC) power to those industrial computing devices. However, while a specific use for the pluggable terminal block 300 has been described, one of skill in the art in possession of the present disclosure will appreciate how other uses of the pluggable terminal block 300 will fall within the scope of the present disclosure as well.

In the illustrated embodiment, the pluggable terminal block 300 includes a pluggable terminal block chassis 302 having a top surface 302*a*, a bottom surface 302*b* that is located opposite the pluggable terminal block chassis 302 from the top surface 302*a*, a front surface 302*c* that extends between the top surface 302*a* and the bottom surface 302*b*, a rear surface 302*d* that is located opposite the pluggable terminal block chassis 302 from the front surface 302*c* and that extends between the top surface 302*a* and the bottom surface 302*b*, and a pair of opposing side surfaces 302*e* and 302*f* that are located opposite the pluggable terminal block chassis 302 from each other and that each extend between the top surface 302*a*, the bottom surface 302*b*, the front surface 302*c*, and the rear surface 302*d*. As will be appreciated by one of skill in the art in possession of the present disclosure, the pluggable terminal block chassis 302 illustrated and described below may provide a European-style terminal block chassis for the European-style terminal block with the modified power connector described above.

The pluggable terminal block chassis 302 includes a computing device connector 304 that extends from the front surface 302*c* of the pluggable terminal block chassis 302 and, in the illustrated embodiment, includes a computing device positive power sub-connector 304*a*, a ground sub-connector 304*b*, and a computing device negative power sub-connector 304*c* that are each configured to connect to the respective positive power sub-connector, negative power sub-connector, and ground sub-connector on the pluggable terminal block connector 204 included on the computing device 200 discussed above with reference to FIG. 2. However, while a specific configuration/order of the positive power sub-connector 304*a*, the ground sub-connector 304*b*, and the negative power sub-connector 304*c* is illustrated and described, one of skill in the art in possession of the present disclosure will appreciate how other configurations/ordering of the positive power sub-connector 304*a*, the ground sub-connector 304*b*, and/or the negative power sub-connector 304*c* will fall within the scope of the present disclosure as well. The pluggable terminal block chassis 302 also includes a pair of securing members 306*a* and 306*b* that extend opposite each other from the side surfaces 302*e* and 302*f*, respectively. In the specific examples provided below, the securing members 306*a* and 306*b* include screws that are configured to secure the pluggable terminal block chassis 302 to the pluggable terminal block connector 204 included on the computing device 200, but one of skill in the art in possession of the present disclosure will appreciate how a variety of securing elements may be used to secure the pluggable terminal block chassis 302 to the pluggable terminal block connector 204 included on the computing device 200 while remaining within the scope of the present disclosure as well.

The pluggable terminal block chassis 302 also includes a power system connector 308 that extends from the rear surface 302*d* of the pluggable terminal block chassis 302. In a specific example, the power system connector 308 may include a cantilever spring (not visible in FIGS. 3A and 3B) that provides a negative power contact and that is configured to engage a power cabling connector on power cabling, and a pin (not visible in FIGS. 3A and 3B) that provides a positive power contact and that is configured to engage the power cabling connector on the power cabling, as discussed in further detail below. However, while a specific structure of the power system connector 308 has been provided, one of skill in the art in possession of the present disclosure will appreciate how other power system connector structures (e.g., with the cantilever spring providing the positive power contact and the pin providing the negative power contact) will fall within the scope of the present disclosure as well.

In the illustrated embodiment, the power system connector 308 also includes a threaded securing subsystem 308*a* that is configured to secure power cabling to the pluggable terminal block 300. In the specific example illustrated in FIGS. 3A and 3B, the power system connector 308 is provided by a female barrel-style power connector that extends from the chassis 302 of the pluggable terminal block 300 and that includes a threaded outer surface. However, as discussed below, the power system connector 308 may be replaced with a female barrel-style power connectors that extend into the chassis 302 of the pluggable terminal block 300 and that are not configured to secure power cabling to the pluggable terminal block 300 while remaining within the scope of the present disclosure as well. Furthermore, while illustrated and described as being provided by barrel-style power connectors, the power system connector 308 may be replaced by a variety of other types of power connectors (e.g., Universal Serial Bus (USB) connectors) that one of skill in the art in possession of the present disclosure would recognize as providing the structural benefits of the barrel-style power connections described below.

As would be appreciated by one of skill in the art in possession of the present disclosure, the power system connector 308 includes a positive power sub-connector and a negative power sub-connector, with the positive power sub-connector on the power system connector 308 coupled to the computing device positive power sub-connector 304*a* on the computing device connector 304, and the negative power sub-connector on the power system connector 308 coupled to the computing device negative power sub-connector 304*c* on the computing device connector 304. In an embodiment, the computing device ground sub-connector 304*b* on the computing device connector 304 may be coupled to the negative power sub-connector on the power system connector 308 (e.g., to allow the computing device ground sub-connector 304*b* to be coupled to ground via a power system connected to the power system connector 308), although one of skill in the art in possession of the present disclosure will appreciate how other techniques for coupling the computing device ground sub-connector 304*b* to ground will fall within the scope of the present disclosure.

Figure 4A:
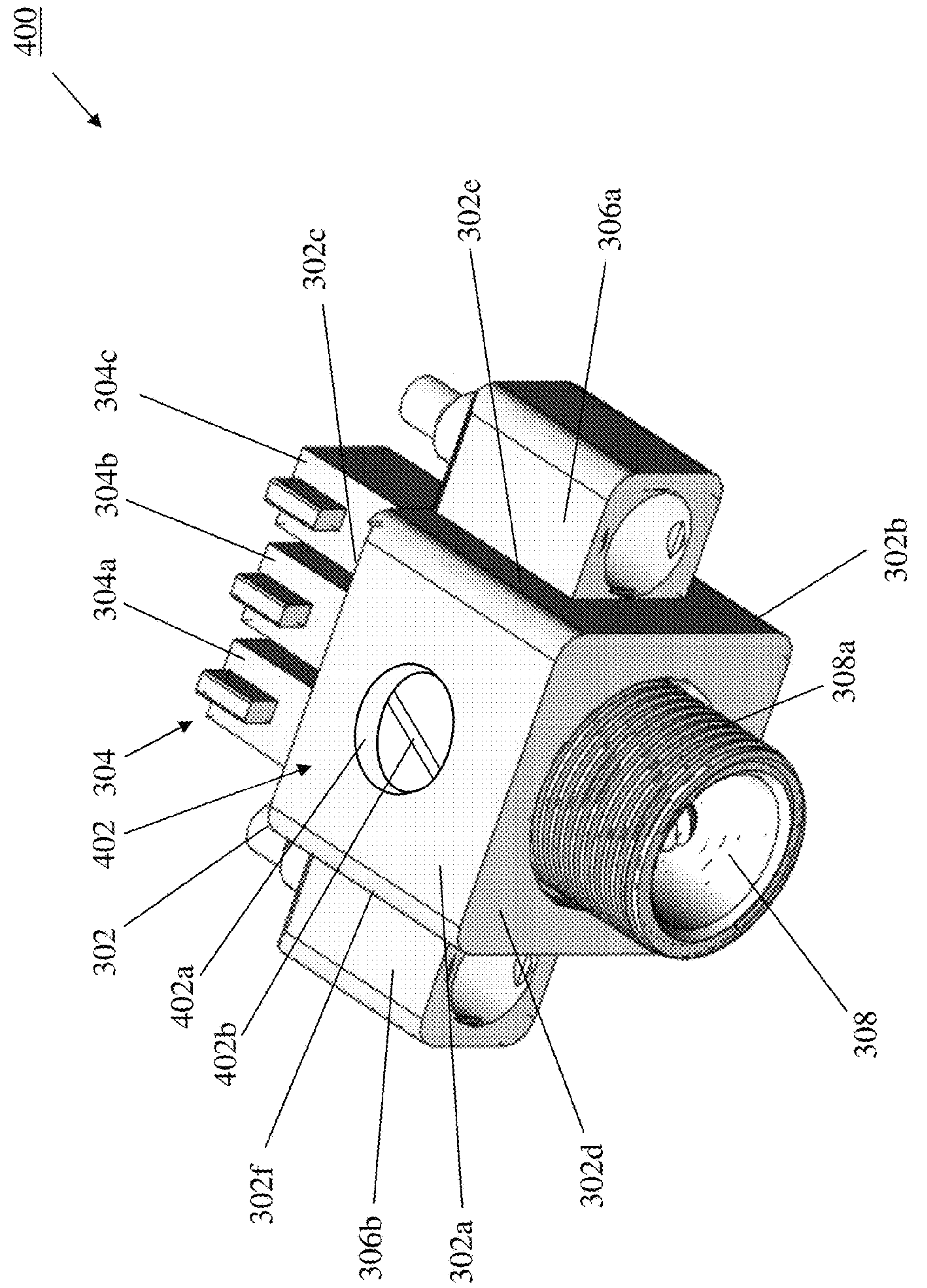
FIG. 4A is a perspective front view illustrating an embodiment of a pluggable terminal block utilized in the pluggable terminal block short circuit prevention system of the present disclosure.
Figure 4B:
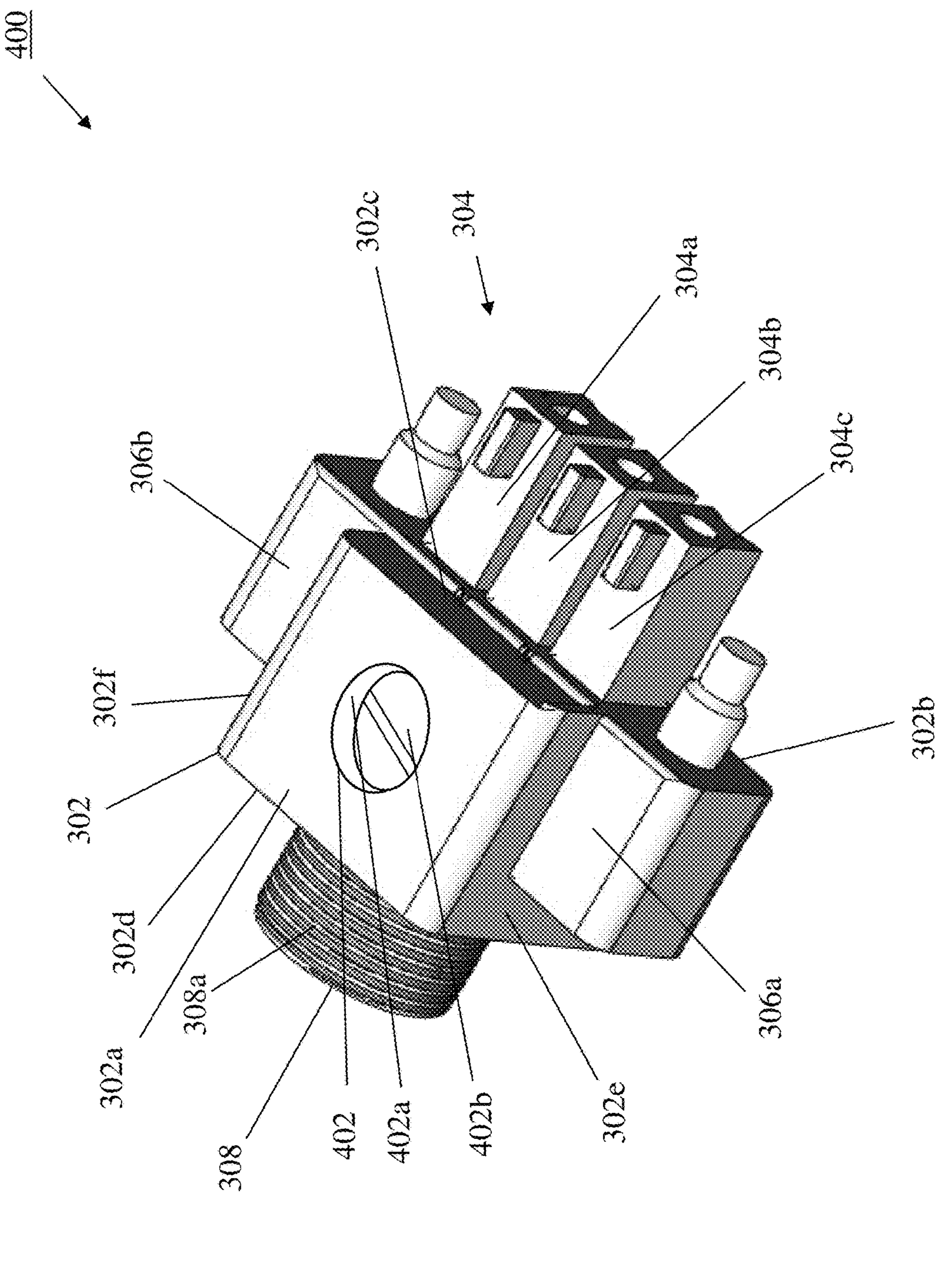
FIG. 4B is a perspective rear view illustrating an embodiment of the pluggable terminal block of FIG. 4A.

For example, referring now to FIGS. 4A and 4B, an embodiment of a pluggable terminal block 400 is illustrated that is substantially similar to the pluggable terminal block 300 discussed above with reference to FIGS. 3A and 3B, and thus similar components are provided with similar element numbers. Similarly as discussed above, the pluggable terminal block 400 may be utilized with the pluggable terminal block short circuit prevention system of the present disclosure and may be used with the computing device 200 and/or other devices that utilize pluggable terminal blocks according to the teachings of the present disclosure. In the illustrated embodiment, the pluggable terminal block 400 includes a ground coupling device 402 that is located on the top surface 302*a* of the pluggable terminal block chassis 302 and that, in the illustrated example, includes a fastener channel 402*a* that is defined by the pluggable terminal block chassis 302, along with a fastener device 402*b* (e.g., a screw in the illustrated example) that is moveably connected to the fastener channel 402*a*. As will be appreciated by one of skill in the art in possession of the present disclosure, a ground contact may be located in the fastener channel 402*a* and coupled to the ground sub-connector 304*b*.

While not illustrated or described in detailed below, and as will be appreciated by one of skill in the art in possession of the present disclosure, following the connection of the pluggable terminal block 400 the computing device 200 (discussed in detail below), a grounding wire (not illustrated in FIG. 4A) may be positioned in the fastener channel 402*a* between the fastener device 402*b* and the ground contact, and then the fastener device 402*b* may tightened to cause the grounding wire to engage the ground contact. As such, the pluggable terminal block of the present disclosure may be grounded in a variety of manners while remaining within the scope of the present disclosure.

Figure 5:
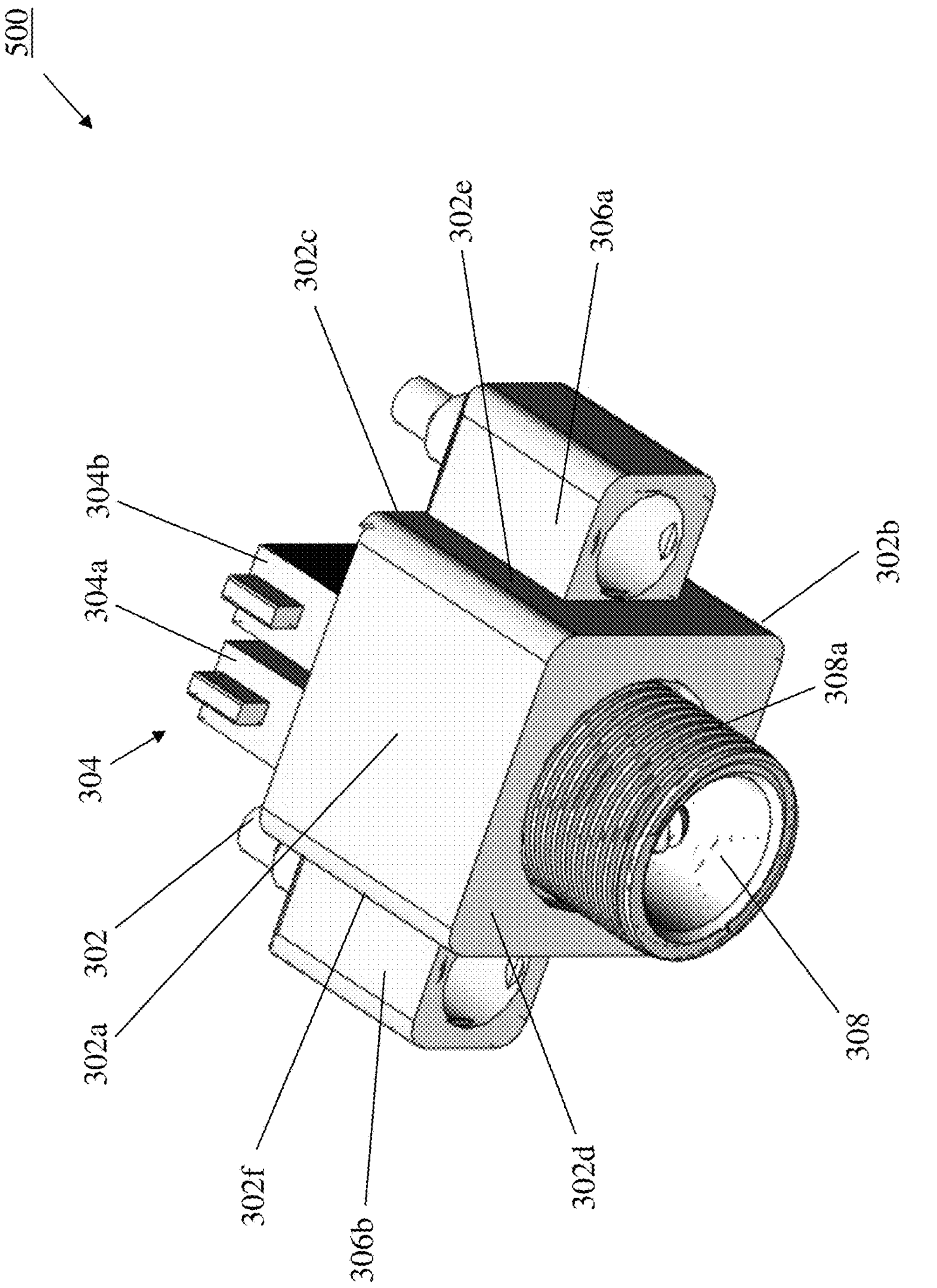
FIG. 5 is a perspective front view illustrating an embodiment of a pluggable terminal block utilized in the pluggable terminal block short circuit prevention system of the present disclosure.

Referring now to FIG. 5, an embodiment of a pluggable terminal block 500 is illustrated that is substantially similar to the pluggable terminal block 300 discussed above with reference to FIGS. 3A and 3B, and thus similar components are provided with similar element numbers. Similarly as discussed above, the pluggable terminal block 500 may be utilized with the pluggable terminal block short circuit prevention system of the present disclosure and may be used with the computing device 200 and/or other devices that utilize pluggable terminal blocks according to the teachings of the present disclosure. As will be appreciated by one of skill in the art in possession of the present disclosure, the pluggable terminal block 500 omits the ground sub-connector 304*b* that is included on the computing device connector 304 on the pluggable terminal block 300. For example, the pluggable terminal block 500 may be utilized with a computing device and or power system that include separate grounding subsystems that do not utilize the pluggable terminal block 500.

Figure 6A:
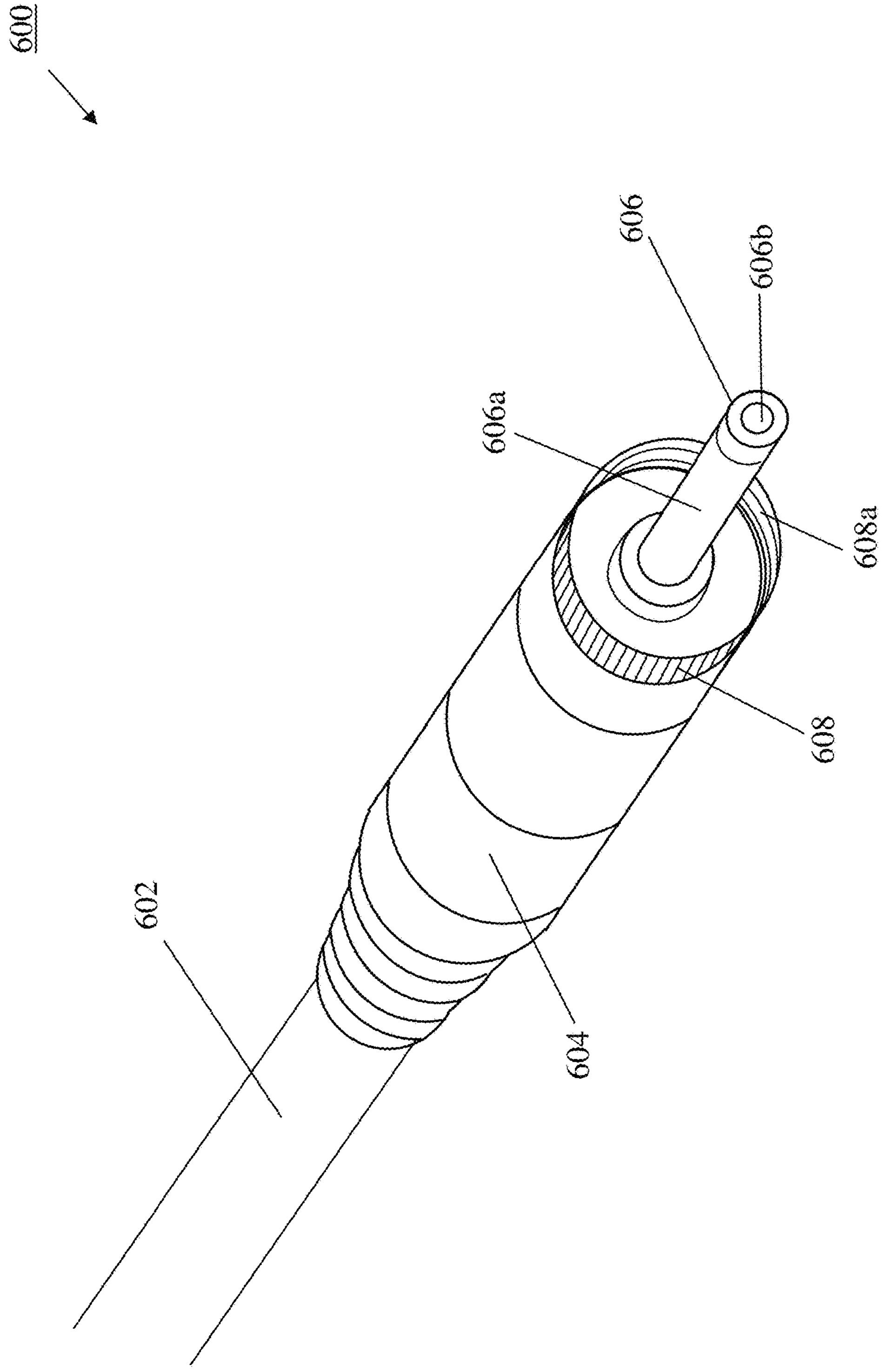
FIG. 6A is a perspective view illustrating an embodiment of a threaded barrel-style connector utilized in the pluggable terminal block short circuit prevention system of the present disclosure.

Referring now to FIG. 6A, an embodiment of power cabling 600 is illustrated that may be utilized with the pluggable terminal block short circuit prevention system of the present disclosure, and provides an example of power cabling that may be secured to the pluggable terminal block. In the embodiment illustrated in FIG. 6A, the power cabling 600 includes a power cable 602 having a power cabling connector included on at least one end (with only a single power cabling connector on one end of the power cable 602 illustrated in FIGS. 6A and 6B). The power cabling connector includes a connector base 604, and a barrel-style power connector 606 extends from the connector base 604 and is configured to transmit power received through the power cable 602 from a power system (not illustrated). The barrel-style power connector 606 includes a negative power contact 606*a* and a positive power contact 606*b*, with the barrel-style power connector 606 configured to prevent relative movement between the negative power contact 606*a* and the positive power contact 606*b*.

In the illustrated embodiment, the negative power contact 606*a* is located on the outer surface of the barrel-style power connector 606 and is configured to engage the cantilever spring (not illustrated in FIGS. 6A and 6B) that provides the negative power contact on the power system connector 308, as discussed above. Furthermore, the positive power contact 606*b* is located on the inner surface of the barrel-style connector 606 and is configured to engage the pin (not illustrated in FIG. 6A) that provides the positive power contact on the power system connector 308, as discussed above. A connector securing element 608 is included on the connector base 604 that is configured to secure the barrel-style power connector 606 in the power system connector 308 on the pluggable terminal blocks 300/400/500 discussed above. As can be seen in FIG. 6A, the connector securing element 608 may include a threaded securing subsystem 608*a* that one of skill in the art in possession of the present disclosure will appreciate is configured to engage the threaded securing subsystem 308*a* on the power connector 308 of the pluggable terminal blocks 300/400/500 discussed above to secure the power cabling 600 to the pluggable terminal blocks 300/400/500.

Figure 6B:
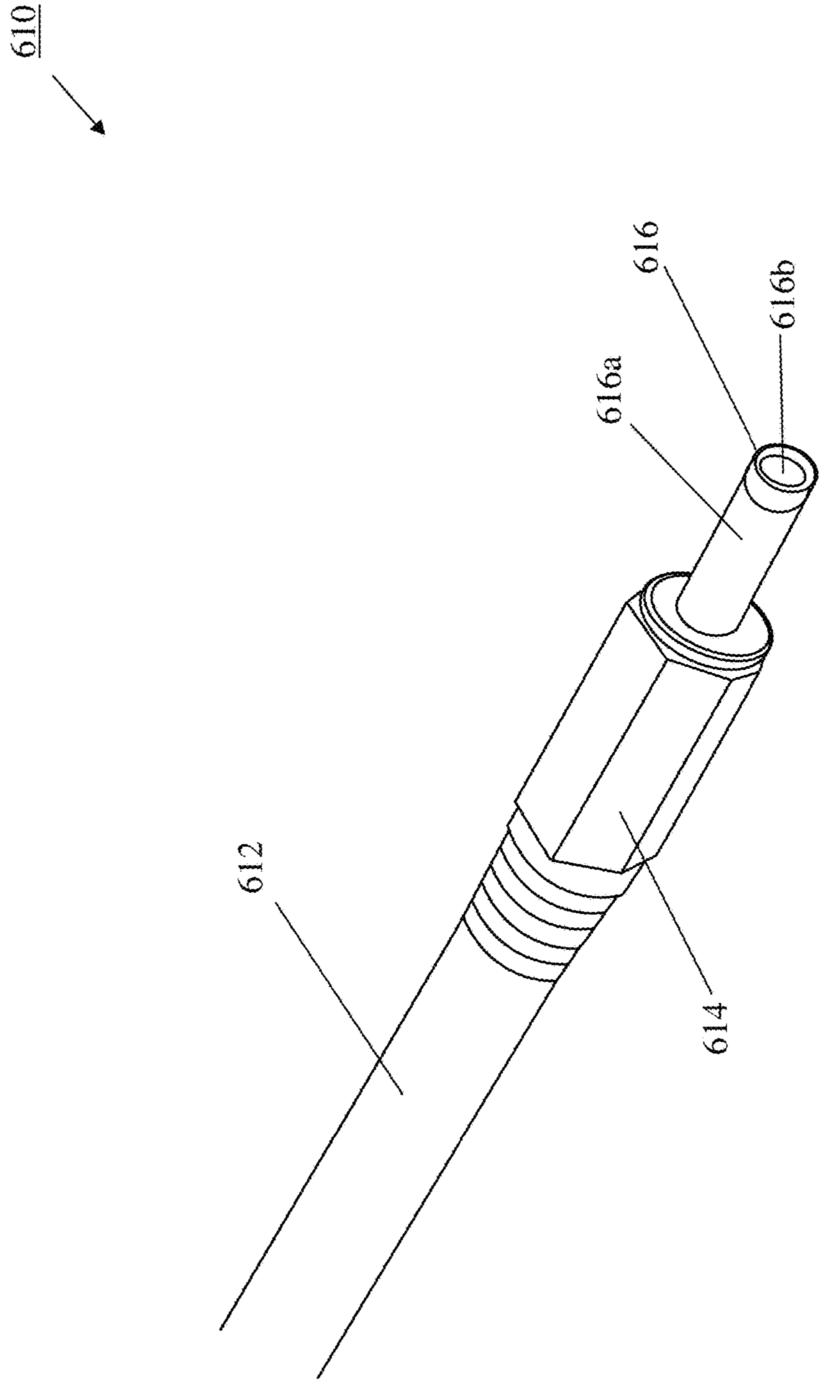
FIG. 6B is a perspective view illustrating an embodiment of a non-threaded barrel-style connector utilized in the pluggable terminal block short circuit prevention system of the present disclosure.

With reference to FIG. 6B, another embodiment of power cabling 610 is illustrated that may be utilized with the pluggable terminal block short circuit prevention system of the present disclosure, and provides an example of power cabling that is not configured to be secured to the pluggable terminal block. In the embodiment illustrated in FIG. 6B, the power cabling 610 includes a power cable 612 having a power cabling connector included on at least one end (with only a single power cabling connector on one end of the power cable 612 illustrated in FIG. 6B). The power cabling connector includes a connector base 614, and a barrel-style power connector 616 extends from the connector base 614 and is configured to transmit power received through the power cable 612 from a power system (not illustrated). The barrel-style power connector 616 includes a negative power contact 616*a* and a positive power contact 616*b*, with the barrel-style power connector 616 configured to prevent relative movement between the negative power contact 616*a* and the positive power contact 616*b*.

In the illustrated embodiment, the negative power contact 616*a* is located on the outer surface of the barrel-style power connector 616, and the positive power contact 616*b* is located on the inner surface of the barrel-style connector 616. As will be appreciated by one of skill in the art in possession of the present disclosure, the power cabling 610 may be configured to connect to the pluggable terminal block in manner similar to that described above for the power cabling 600, but via a female barrel-style power connector that extends into the chassis 302 of the pluggable terminal block 300 and that is not configured to secure power cabling 610 to the pluggable terminal block. However, while specific examples of power cabling used with the pluggable terminal blocks of the present disclosure have been illustrated and described, one of skill in the art in possession of the present disclosure will appreciate how other power cabling may be utilized with the pluggable terminal blocks of the present disclosure while remaining within the scope of the present disclosure as well.

Figure 7:
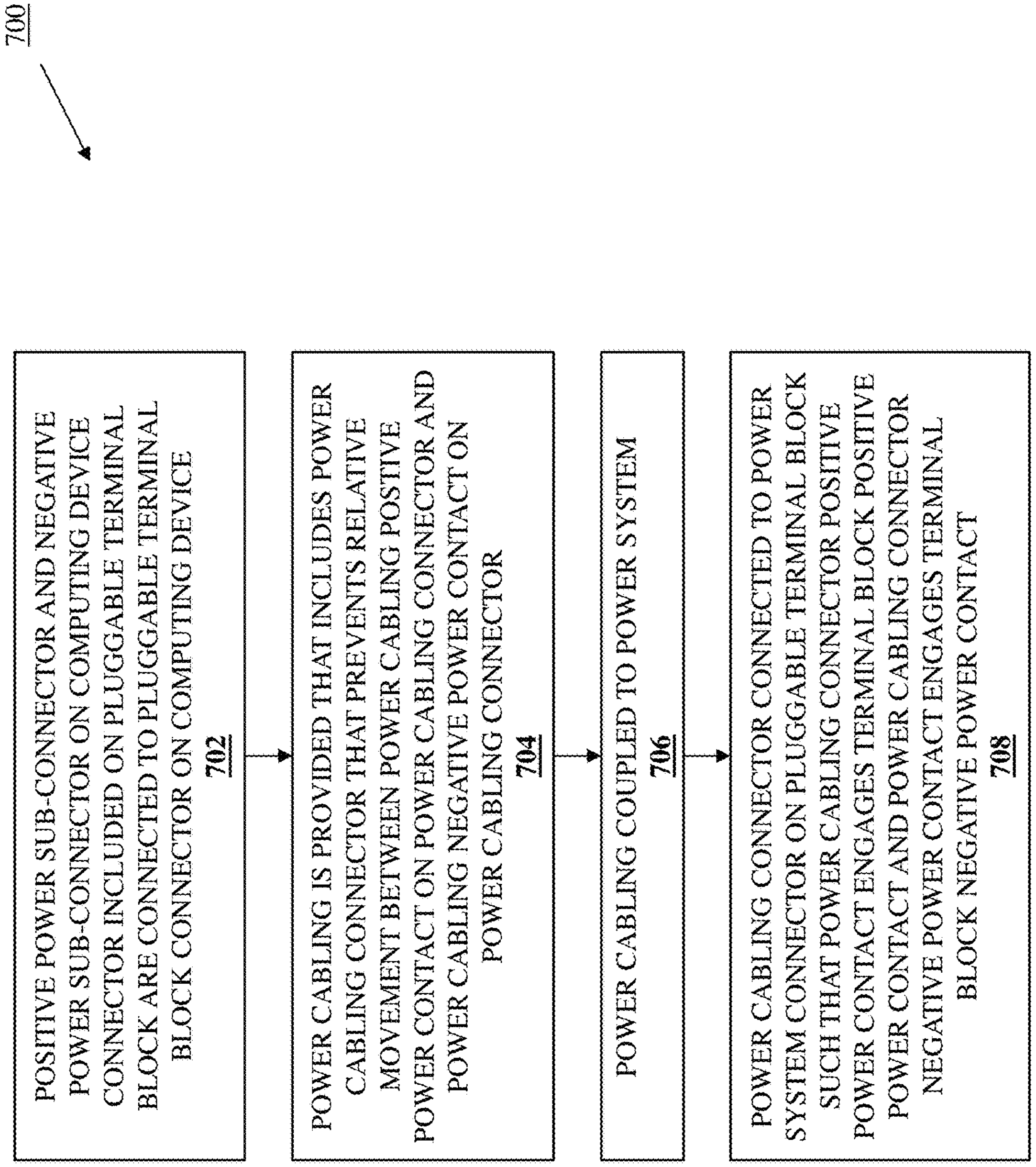
FIG. 7 is a flow chart illustrating an embodiment of a method for preventing short circuits with a pluggable terminal block.

Referring now to FIG. 7, an embodiment of a method 700 for preventing short-circuits with a pluggable terminal block is illustrated. As discussed below, the systems and methods of the present disclosure provide a pluggable terminal block that includes a power system connector that is configured to couple to a power cabling connector that prevents relative movement between its power cabling connector positive and negative power contacts. For example, the pluggable terminal block short circuit prevention system of the present disclosure may include a pluggable terminal block having a computing device connector with a positive and negative power sub-connectors that connect to a pluggable terminal block connector on a computing device. A power system connector is included on the pluggable terminal block and includes a terminal block positive and negative power contacts that are coupled to the positive and negative power sub-connectors on the computing device connector, respectively. The power system connector couples to a power system via power cabling having a power cabling connector that includes power cabling positive and negative power contacts that are configured to engage the terminal block positive and negative power contacts when the power cabling connector is connected to the power system connector, with the power cabling connector preventing relative movement between the power cabling connector positive and negative power contacts. As discussed below, the configuration of the power system connector on the pluggable terminal block to couple to a power cabling connector that prevents relative movement between its power cabling connector positive and negative power contacts prevents the power cabling connector positive and negative power contacts from engaging, thus preventing short circuits and/or arcing when using the pluggable terminal block.

Figure 8A:
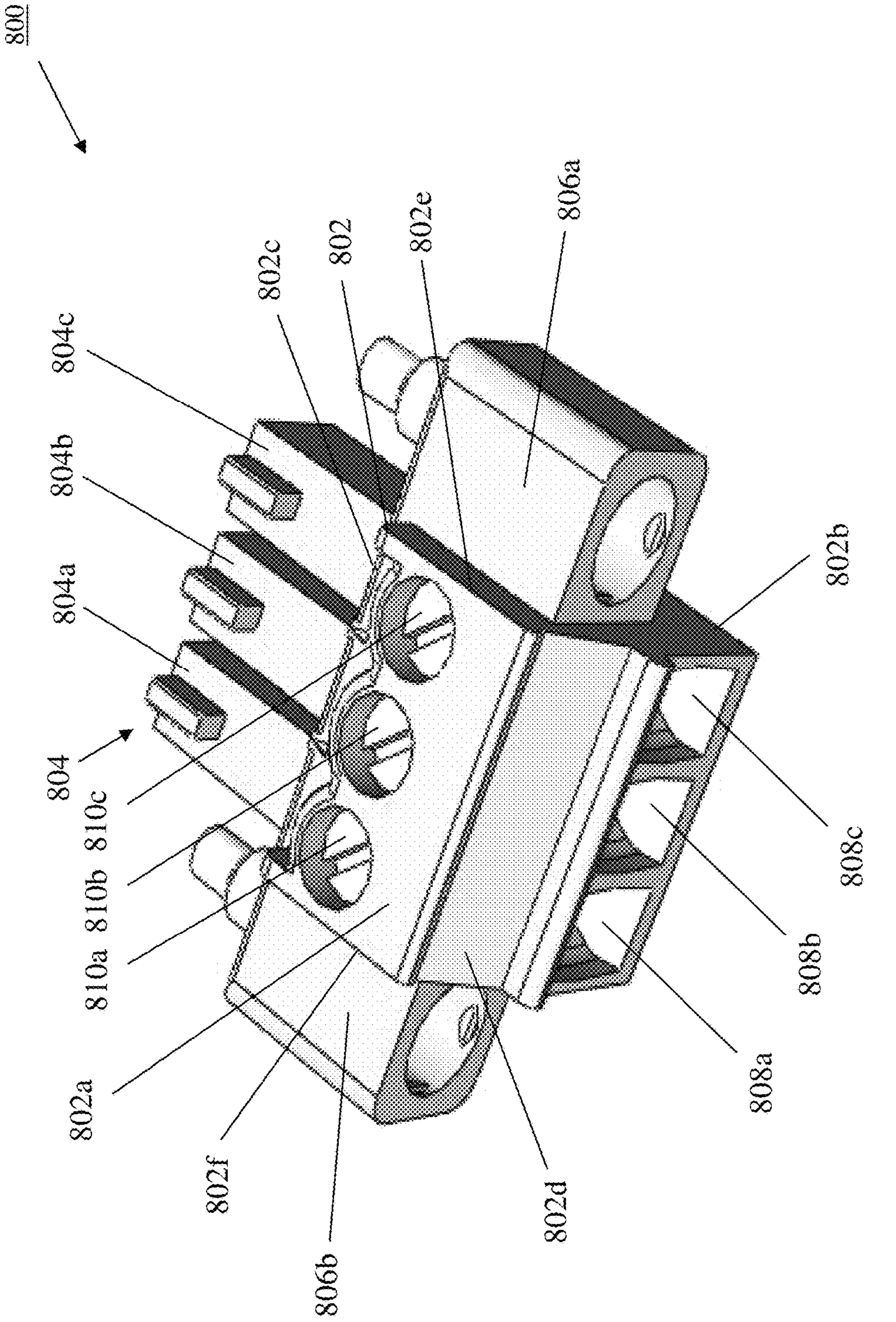
(Prior Art) FIG. 8A
FIG. 8A is a perspective view illustrating an embodiment of a conventional pluggable terminal block.

With reference to FIG. 8A, an embodiment of a conventional pluggable terminal block 800 is illustrated that one of skill in the art in possession of the present disclosure will recognize provides a conventional European-style terminal block that utilizes power wire couplings having respective power wire contacts that each are configured to accept respective exposed portions of power wires (a positive wire, a negative wire, and a ground wire in the illustrated embodiment) on power cabling that is coupled to a power system. As can be seen in FIG. 8A, the conventional pluggable terminal block 800 includes a pluggable terminal block chassis 802 having a top surface 802*a*, a bottom surface 802*b* that is located opposite the pluggable terminal block chassis 802 from the top surface 802*a*, a front surface 802*c* that extends between the top surface 802*a* and the bottom surface 802*b*, a rear surface 802*d* that is located opposite the pluggable terminal block chassis 802 from the front surface 802*c* and that extends between the top surface 802*a* and the bottom surface 802*b*, and a pair of opposing side surfaces 802*e* and 802*f* that are located opposite the pluggable terminal block chassis 802 from each other and that each extend between the top surface 802*a*, the bottom surface 802*b*, the front surface 802*c*, and the rear surface 802*d*.

The pluggable terminal block chassis 802 includes a computing device connector 804 that extends from the front surface 802*c* of the pluggable terminal block chassis 802 and includes a computing device positive power sub-connector 804*a*, a computing device negative power sub-connector 804*b*, and a ground sub-connector 804*c* that are each configured to connect to a respective positive power sub-connector, negative power sub-connector, and ground sub-connector on a pluggable terminal block connector included on a computing device (e.g., similar to the pluggable terminal block connector 204 on the computing device 200 discussed above with reference to FIG. 2). The pluggable terminal block chassis 802 also includes a pair of securing members 806*a* and 806*b* that extend opposite each another from the side surfaces 802*e* and 802*f*, respectively, and that include screws that are configured to secure the pluggable terminal block chassis 802 to the pluggable terminal block connector on the computing device.

The pluggable terminal block chassis 802 also includes a positive power wire coupling 808*a*, a negative power wire coupling 808*b*, and a ground wire coupling 808*c* that are located on the rear surface 802*d* of the pluggable terminal block chassis 802. As would be appreciated by one of skill in the art in possession of the present disclosure, the positive power wire coupling 808*a* includes a positive power contact that coupled to the computing device positive power sub-connector 804*a* on the computing device connector 804, the negative power wire coupling 808*b* includes a negative power contact that is coupled to the computing device negative power sub-connector 804*b* on the computing device connector 804, and the ground wire coupling 808*c* includes a ground contact that coupled to the computing device ground sub-connector 804*c* on the computing device connector 804.

The pluggable terminal block chassis 802 also includes a positive power wire securing member 810*a*, a negative power wire securing member 810*b*, and a ground wire securing member 810*c* (e.g., each provided by a respective screw in the illustrated example) that are located on the top surface 802*a* of the pluggable terminal block chassis 802. As will be appreciated by one of skill in the art in possession of the present disclosure, each of the positive power wire securing member 810*a*, the negative power wire securing member 810*b*, and the ground wire securing member 810*c* are configured to move relative to the pluggable terminal block chassis 802 to secure respective power wires to the pluggable terminal block 800.

Figure 8B:
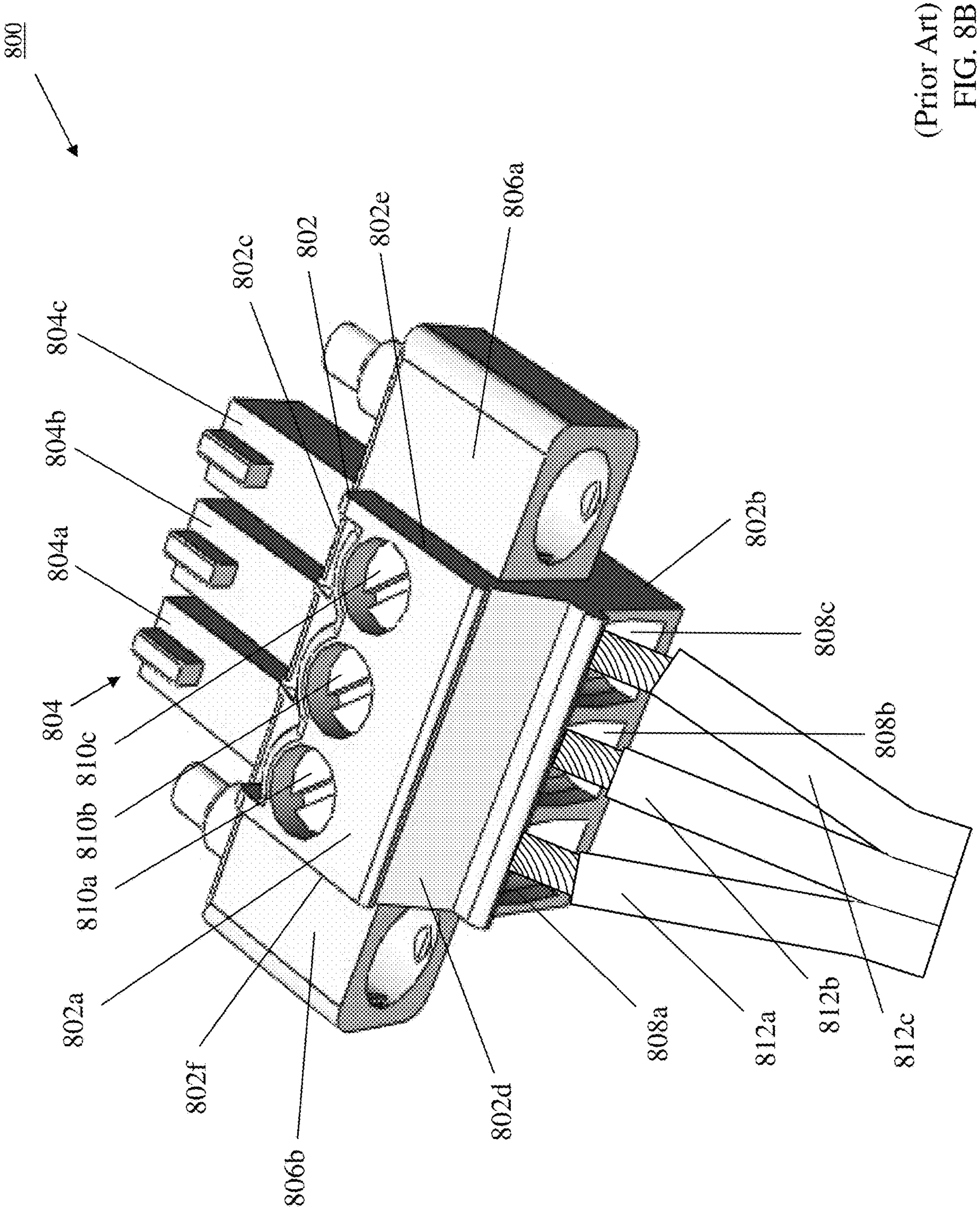
(Prior Art) FIG. 8B
FIG. 8B is a perspective view illustrating an embodiment of the use of the conventional pluggable terminal block of FIG. 8A.

For example, with reference to FIG. 8B, power cabling with a positive power wire 812*a*, a negative power wire 812*b*, and a ground wire 812*c* may be coupled to a power system (not illustrated), and the ends of each of the positive power wire 812*a*, the negative power wire 812*b*, and the ground wire 812*c* may be "stripped" or otherwise exposed as illustrated. The exposed ends of the positive power wire 812*a*, the negative power wire 812*b*, and the ground wire 812*c* may then be inserted into the respective positive power wire coupling 808*a*, negative power wire coupling 808*b*, and ground wire coupling 808*c*. The positive power wire 812*a*, negative power wire 812*b* and ground wire 812*c* may then be secured to the respective contacts in the positive power wire coupling 808*a*, the negative power wire coupling 808*b*, and the ground coupling 808*c* by tightening the respective screws included in the respective positive power wire securing member 810*a*, negative power wire securing member 810*b*, and ground wire securing member 810*c*, thus allowing power from the power system to be transmitted via the power cabling, through the pluggable terminal block 800, and to the computing device.

Figure 8C:
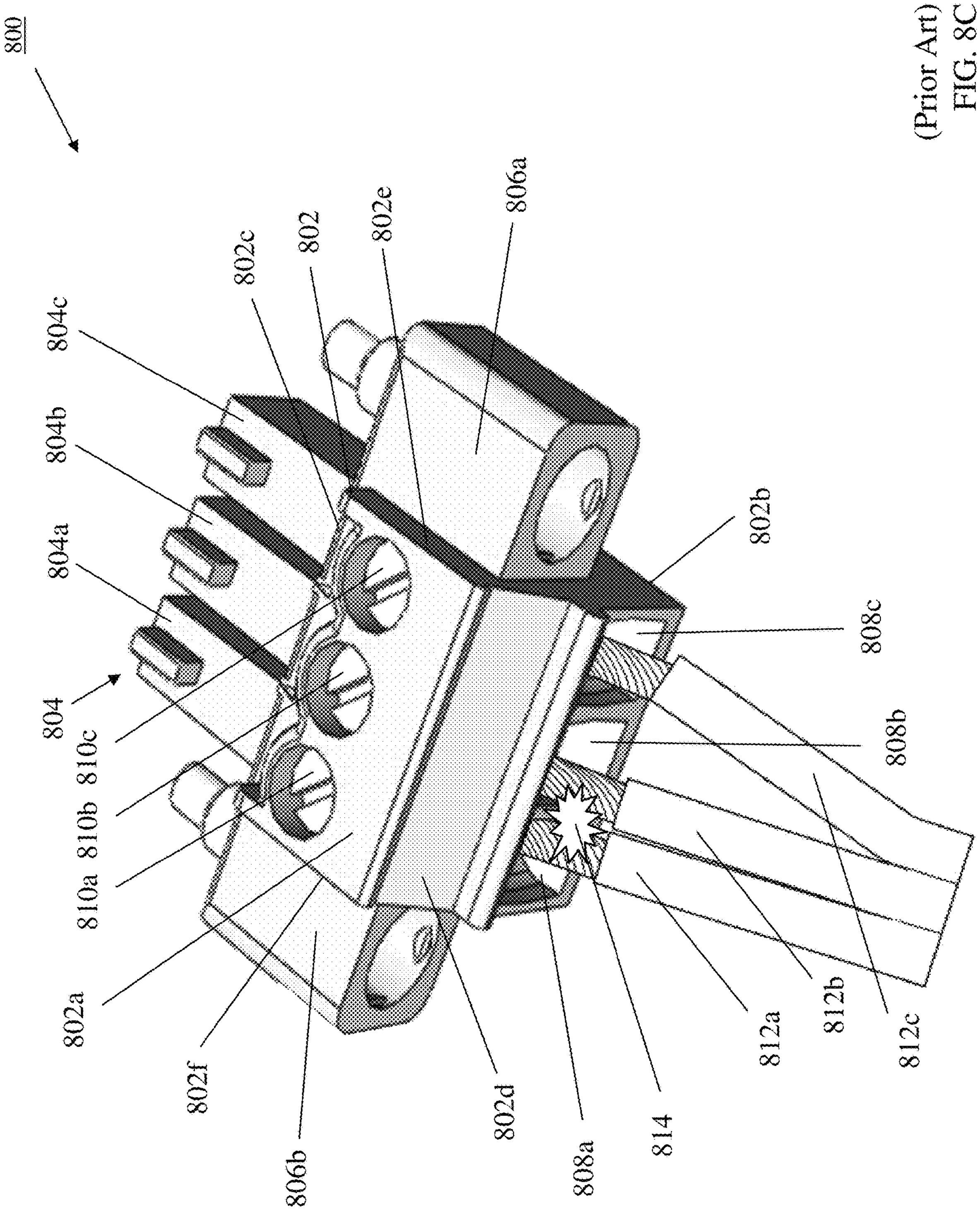
(Prior Art) FIG. 8C
FIG. 8C is a perspective view illustrating an embodiment of issues associated with the use of the conventional pluggable terminal block of FIG. 8A.

With reference to FIG. 8C, in some situations the use of the exposed wires on the power cabling with the conventional pluggable terminal block 800 can result in short circuits, arcing, and/or other issues that would be apparent to one of skill in the art in possession of the present disclosure. For example, when stress is put on the power cabling, when the positive power wire 812*a*, and negative power wire 812*b* are not sufficiently separated, and/or in other short circuit or arcing scenarios known in the art, the positive power wire 812*a* and negative power wire 812*b* may engage and/or be positioned close enough to each other such that a short circuit and/or arcing 814 may occur, which as discussed above can result in smoke and/or other issues that can damage the computing device and/or power system to which they are connected, and/or present issues with the environments in which they are located (e.g., "magic" smoke created by a short circuit can contaminate a clean room environment and may be very costly to remedy). As discussed below, the pluggable terminal block of the present disclosure prevents such issues via the utilization of a power system connector that is configured to connect to power cabling connectors that prevent relative movement of their positive and negative power contacts.

Figure 9A:
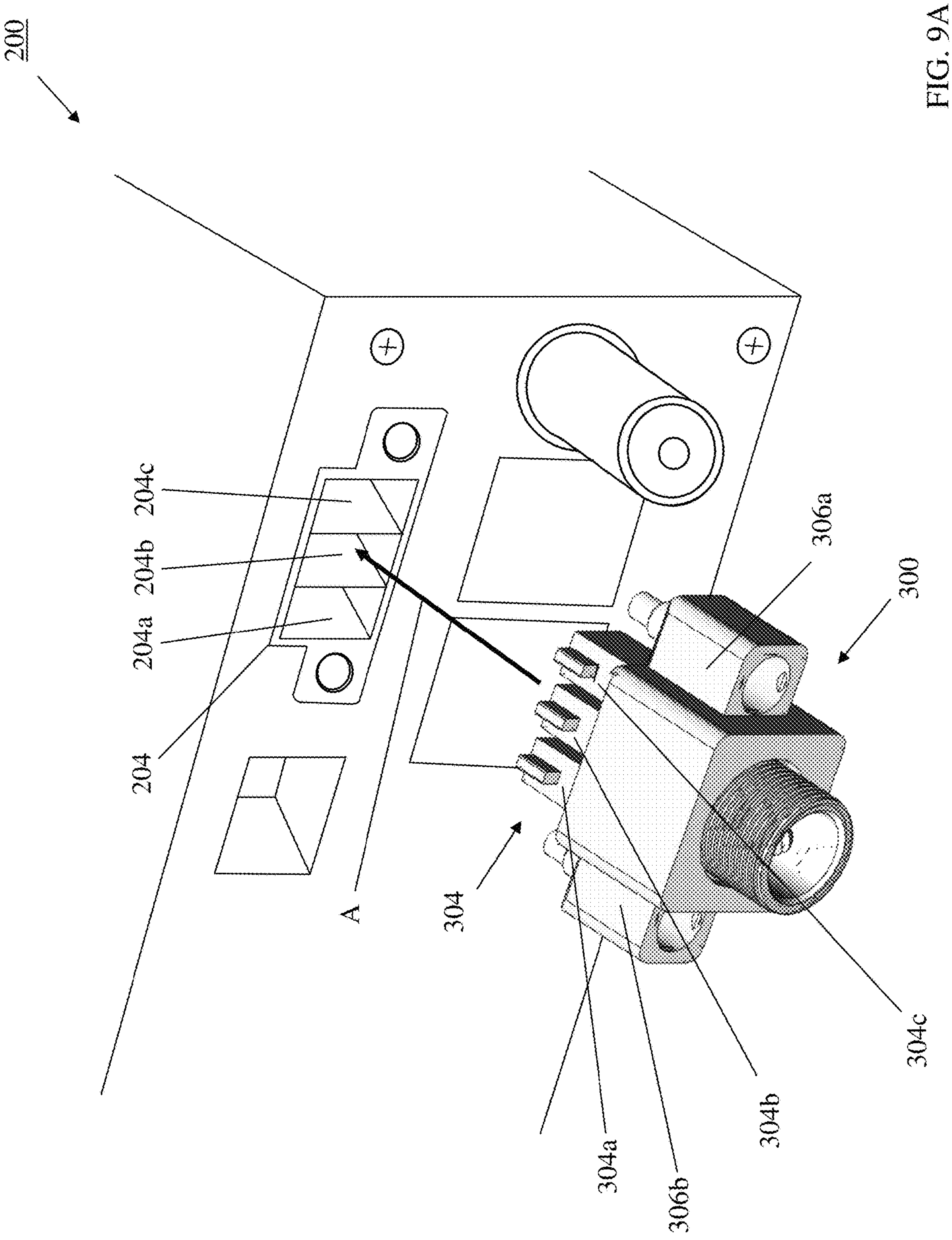
FIG. 9A is a perspective view illustrating an embodiment of the pluggable terminal block of FIGS. 3A and 3B being connected to the computing device of FIGS. 2A and 2B during the method of FIG. 7.
Figure 9B:
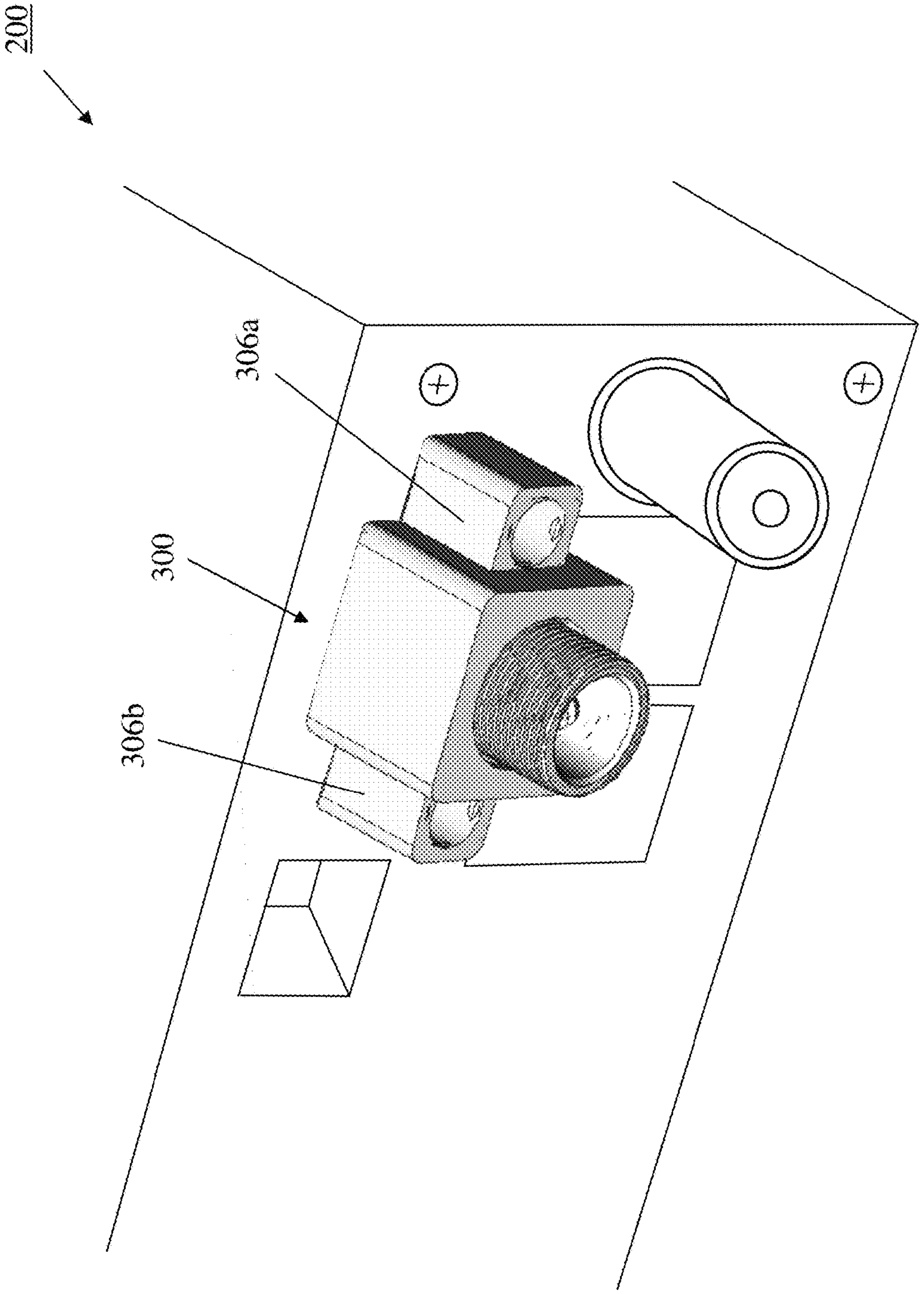
FIG. 9B is a perspective view illustrating an embodiment of the pluggable terminal block of FIGS. 3A and 3B connected to the computing device of FIGS. 2A and 2B during the method of FIG. 7.

The method 700 begins at block 702 where a positive power sub-connector and negative power sub-connector on a computing device connector included on a pluggable terminal block are connected to a pluggable terminal block connector on a computing device. With references to FIGS. 9A and 9B, in an embodiment of block 702, the computing device positive power sub-connector 304*a*, the negative power sub-connector 304*c*, and the ground sub-connector 304*b* included on the computing device connector 304 on the pluggable terminal block 300 are connected to the pluggable terminal block connector 204 included on the computing device 200. For example, the pluggable terminal block 300 may be positioned adjacent the pluggable terminal block connector 204 such that the positive power sub-connector 304*a*, negative power sub-connector 304*c*, and the ground sub-connector 304*b* on the computing device connector 304 are aligned with the positive power sub-connector 204*a*, the negative power sub-connector 204*c*, and the ground sub-connector 204*b* on the pluggable terminal block connector 204.

The pluggable terminal block 300 may then be moved in a direction A towards the pluggable terminal block connector 204 until the positive power sub-connector 304*a*, the negative power sub-connector 304*c*, and the ground sub-connector 304*b* on the computing device connector 304 engage the positive power sub-connector 204*a*, the negative power sub-connector 204*c*, and the ground sub-connector 204*b* on the pluggable terminal block connector 204. However, as discussed above, while the pluggable terminal block 300 and pluggable terminal block connector 204 are illustrated as including ground sub-connector 304*b* and 204*b*, respectively, embodiments in which the ground sub-connectors are omitted will fall within the scope of the present disclosure as well. As will be appreciated by one of skill in the art in possession of the present disclosure, following the connection of the pluggable terminal block 300 to the pluggable terminal block connector 204, screws or other securing elements included in the securing members 306*a* and 306*b* (not visible in FIGS. 9A and 9B) may be tightened (or otherwise actuated) to secure the pluggable terminal block 300 to the computing device 200 and the pluggable terminal block connector 204. However, while a specific example of connecting a pluggable terminal block 300 to a computing device/pluggable terminal block connector has been illustrated and described, one of skill in the art in possession of the present disclosure will appreciate how the pluggable terminal block 300 may be connected to computing devices/pluggable terminal block connectors in other manners while remaining within the scope of the present disclosure as well.

Figure 9C:
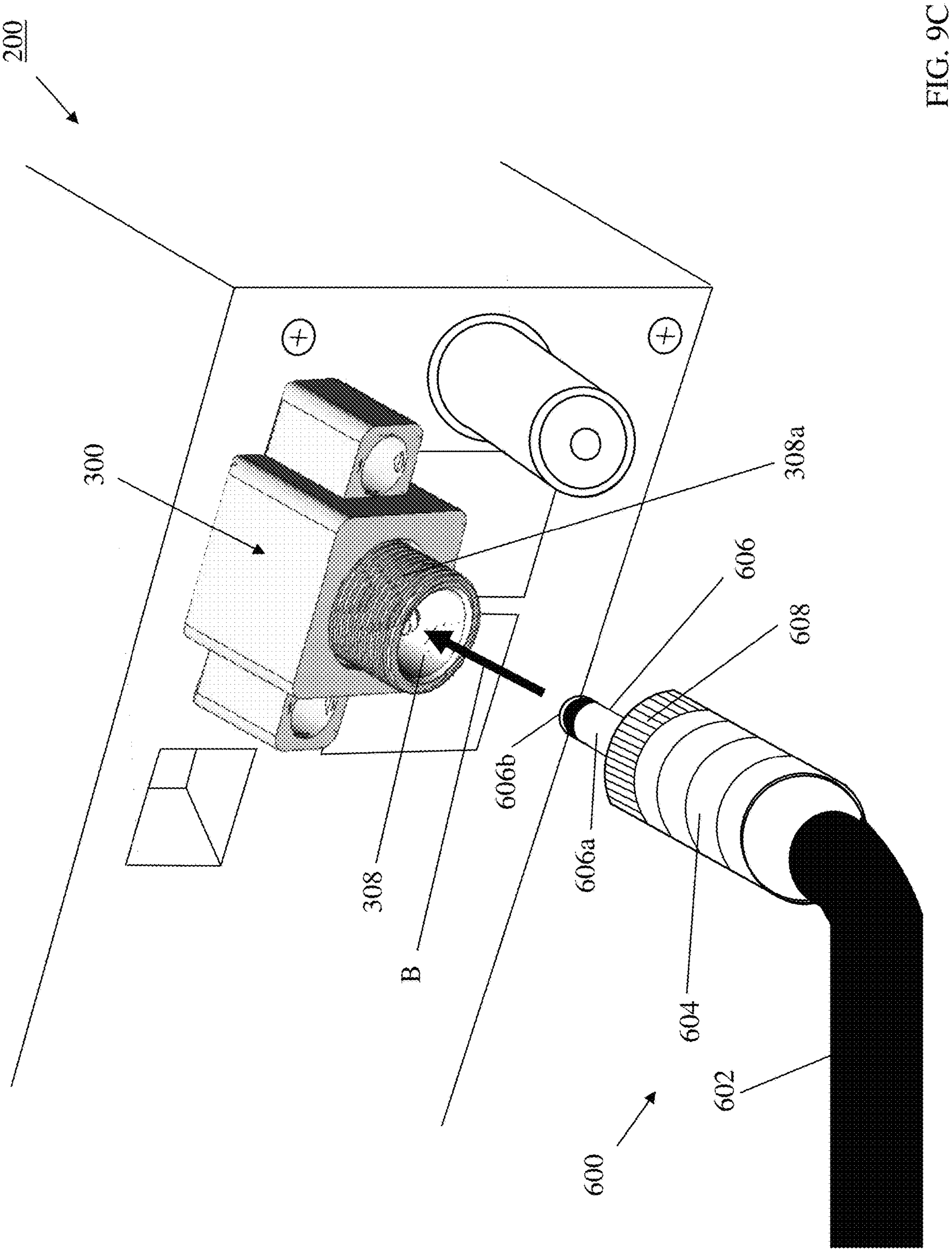
FIG. 9C is a perspective view illustrating an embodiment of the barrel-style connector of FIG. 6A or 6B being connected to the pluggable terminal block and computing device of FIG. 9B during the method of FIG. 7.

The method 700 then proceeds to block 704 where power cabling is provided that includes a power cabling connector that prevents relative movement between a power cabling positive power contact on the power cabling connector and a power cabling negative power contact on the power cabling connector. With reference to FIGS. 6A and 9C, in an embodiment of block 704, the power cabling 600 discussed above may be provided that includes the barrel-style power connector 606 that prevents relative movement between its power cabling negative power contact 606*a* and its power cabling positive power contact 606*b*. To provide specific example using the structure discussed above, the power cabling negative power contact 606*a* on the barrel-style power connector 606 may be located on the outer surface of the barrel-style power connector 606, and as discussed above that power cabling negative power contact 606*a* is configured to contact the cantilevered spring that provides the negative power contact in the power system connector 308. Similarly, the power cabling positive power contact 606*b* on the barrel-style power connector 606 may be located on the inner surface of the barrel-style power connector 606, and as discussed above that power cabling positive power contact 606*b* is configured to contact the pin that provides the positive power contact in the power system connector 308.

As will be appreciated by one of skill in the art in possession of the present disclosure, the barrel-style power connector 606 prevents the power cabling negative power contact 606*a* located on the outer surface of the barrel-style power connector 606 from moving relative to the power cabling positive power contact 606*b* located on the inner surface of the barrel-style power connector 606. However, while a specific example of a barrel-style power connector that prevents relative movement between its positive and negative power contacts has been described, one of skill in the art in possession of the present disclosure will appreciate how other power cabling connectors that prevent relative movement between their positive and negative power contacts (e.g., other fixed structure power connectors that would be apparent to one of skill in the art in possession of the present disclosure) may be utilized while remaining within the scope of the present disclosure as well.

The method 700 then proceeds to block 706 where the power cabling is coupled to a power system. In an embodiment, at block 706, the power cabling 600 discussed above with reference to FIG. 6A is coupled to a power system directly, via a power adapter, and/or in a variety of other manners that would be apparent to one of skill in the art in possession of the present disclosure. For example, as discussed above, the power cabling 600 may include any of a variety of power system connectors (not illustrated in FIG. 6A) on the opposite end of the power cable 602 from the connector base 604, and any of those power system connectors may be configured to couple the power cabling 600 to a variety of different power systems.

Figure 9D:
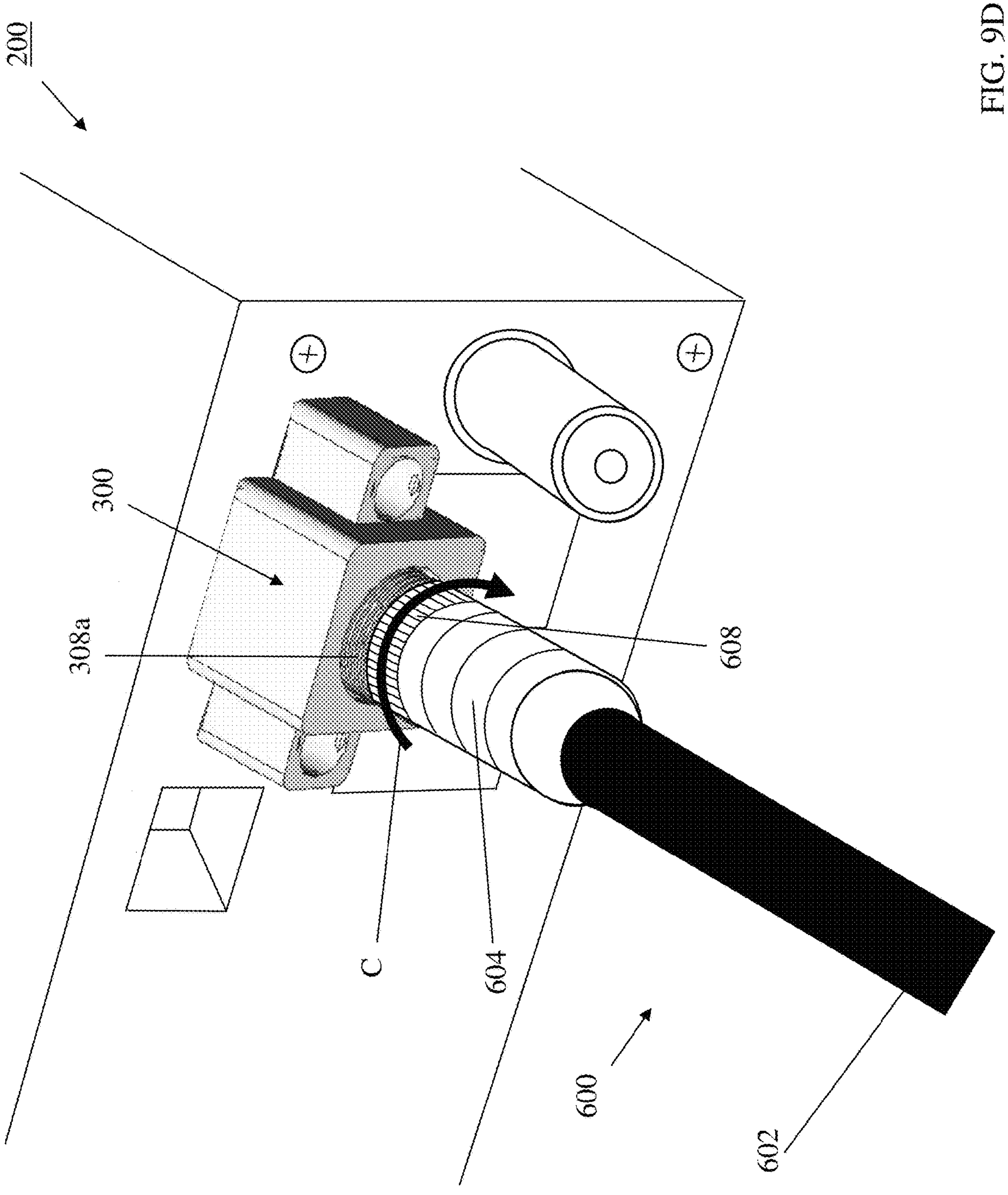
FIG. 9D is a perspective view illustrating an embodiment of the barrel-style connectors of FIG. 6A or 6B being connected to the pluggable terminal block and computing device of FIG. 9B during the method of FIG. 7.

The method 700 then proceeds to block 708 where the power cabling connector is connected to the power system connector on the pluggable terminal block such that the power cabling connector positive power contact engages the pluggable terminal block positive power contact and the power cabling connector negative power contact engages the pluggable terminal block negative power contact. With reference to FIGS. 9C and 9D, in an embodiment of block 708, the barrel-style power connector 606 included on the power cabling 600 is connected to the pluggable terminal block 300 that was connected to the computing device 200 at block 702. For example, the power cabling 600 may be placed adjacent the power system connector 308 included on the pluggable terminal block 300 such that the barrel-style power connector 606 and the connector securing element 608 on the power cabling 600 are aligned with the power system connector 308, as illustrated in FIG. 9C. Continuing with the specific example provided above, the connector base 604 is then moved in a direction B towards the power system connector 308 until the positive power contact on the barrel-style power connector 606 engages with the pin that provides the positive power contact on the power system connector 308, the negative power contact on the barrel-style power connector 606 engages the cantilever spring that provides the negative power contact on the power system connector 308, and the threaded securing subsystem 608*a* included on the connector base 604 engages with the threaded securing subsystem 308*a* included on the power system connector 308.

Figure 9E:
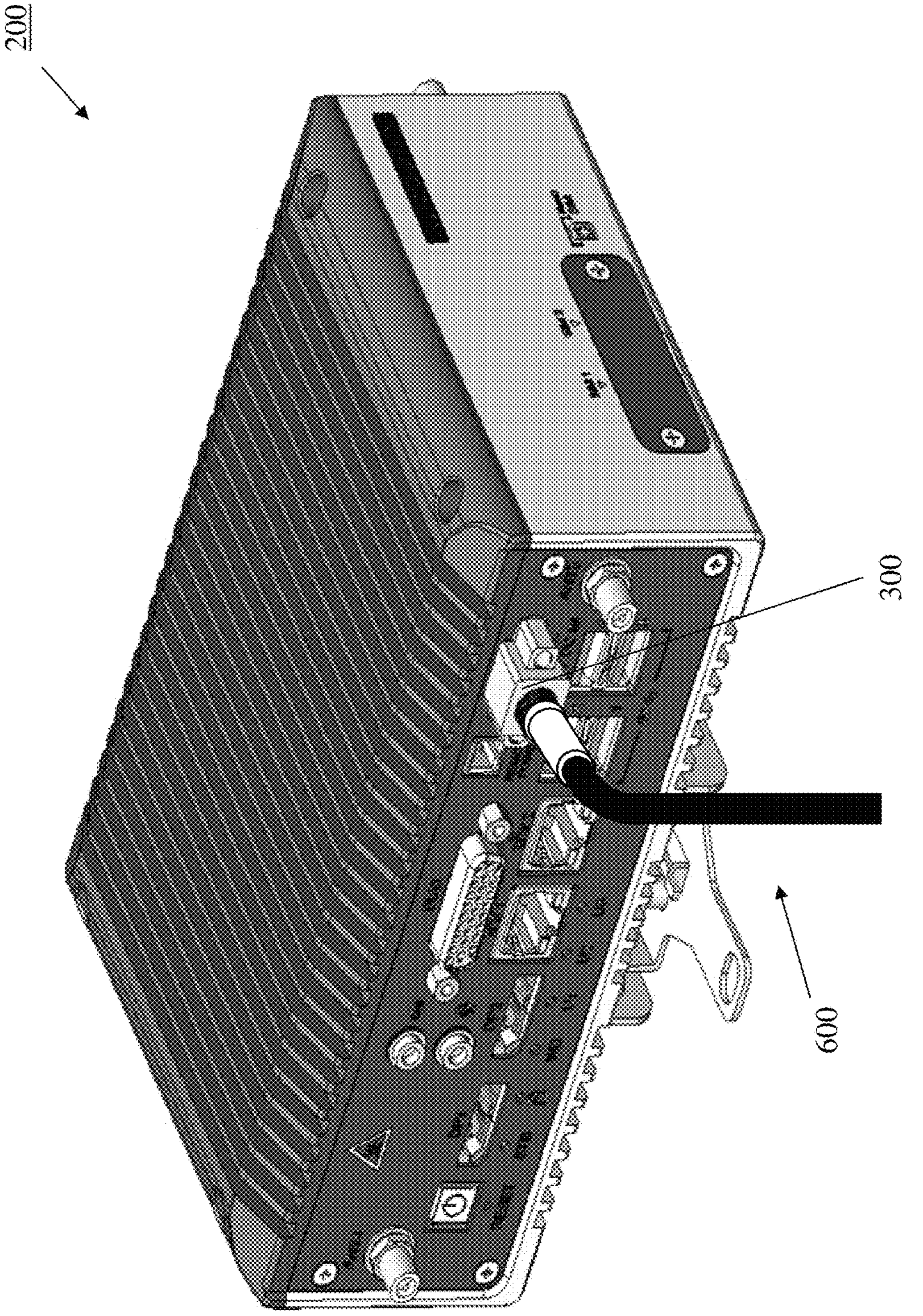
FIG. 9E is a perspective view illustrating an embodiment of the barrel-style connector of FIG. 6A or 6B connected to the pluggable terminal block and computing device of FIG. 9B during the method of FIG. 7.

With reference to FIGS. 9D and 9E, following the engagement of the barrel-style power connector 606 and the threaded securing subsystem 608*a* with the power system connector 308 as discussed above, the threaded securing subsystem 608*a* may be rotated in a direction C relative to the power system connector 308 to secure the power cabling 600 to the power system connector 308 on the pluggable terminal block 300. While not described in detail, one of skill in the art in possession of the present disclosure will appreciate how the barrel-style power connector 616 on the power cabling 610 described above with reference to FIG. 6B may couple to a female barrel-style power connector that replaces the power system connector 308 and extends into the chassis 302 of the pluggable terminal block 300 without securing the power cabling 610 to the pluggable terminal block 300 similarly as described above while remaining within the scope of the present disclosure as well. However, while a specific example of the use of a barrel-style power connector with the pluggable terminal block of the present disclosure has been described, as discussed above other types of fixed structure power cabling connectors may be utilized with the pluggable terminal block of the present disclosure while remaining within the scope of the present disclosure as well.

As will be appreciated by one of skill in the art in possession of the present disclosure, fixed structure power system connectors (e.g., the barrel-style connectors discussed above, and/or other fixed structure power system connectors that may be utilized with the pluggable terminal block of the present disclosure) that include positive and negative power contacts that cannot move relative to each other prevent those positive and negative power contacts from coming into contact with each other as occurs with the exposed wire power cabling used with conventional pluggable terminal blocks, thus preventing short circuits and/or arcing during or subsequent to the coupling of the power system to the pluggable terminal block at blocks 706 and 708.

Thus, systems and methods have been described that provide for a pluggable terminal block that includes a power system connector that is configured to couple to a power cabling connector that prevents relative movement between its power cabling connector positive and negative power contacts. For example, the pluggable terminal block short circuit prevention system of the present disclosure may include a pluggable terminal block having a computing device connector with a positive and negative power sub-connectors that connect to a pluggable terminal block connector on a computing device. A power system connector is included on the pluggable terminal block and includes a terminal block positive and negative power contacts that are coupled to the positive and negative power sub-connectors on the computing device connector, respectively. The power system connector couples to a power system via power cabling having a power cabling connector that includes power cabling positive and negative power contacts that are configured to engage the terminal block positive and negative power contacts when the power cabling connector is connected to the power system connector, with the power cabling connector preventing relative movement between the power cabling connector positive and negative power contacts. As such, the power system connector on the pluggable terminal block of the present disclosure must be used with a power cabling connector that prevents relative movement between its power cabling connector positive and negative power contacts, which prevents short circuits and/or arcing when using the pluggable terminal block.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A pluggable terminal block short circuit prevention system, comprising:

a pluggable terminal block chassis;

a computing device connector that extends from the pluggable terminal block chassis, that includes a computing device positive power sub-connector, a computing device negative power sub-connector, and a computing device ground sub-connector, and that is configured to connect to a pluggable terminal block connector on a computing device;

a ground coupling device that is included on the pluggable terminal block chassis, that is coupled to the computing device ground sub-connector, and that is configured to connect to a grounding wire to couple the computing device ground sub-connector to the grounding wire; and a power system connector that is included on the pluggable terminal block chassis and that includes a terminal block positive power contact that is coupled to the computing device positive power sub-connector, and a terminal block negative power contact that is coupled to the computing device negative power sub-connector, wherein the power system connector is configured to couple to a power system via power cabling having a power cabling connector that includes:

a power cabling connector positive power contact that is configured to engage the terminal block positive power contact when the power cabling connector is connected to the power system connector; and a power cabling connector negative power contact that is configured to engage the terminal block negative power contact when the power cabling connector is connected to the power system connector, wherein the power cabling connector prevents relative movement between the power cabling connector positive power contact and the power cabling connector negative power contact.

2. The system of claim 1, wherein the power system connector and the power cabling connector are barrel-style power connectors.

3. The system of claim 2, wherein the barrel-style power connectors are configured to be secured together using corresponding threaded securing subsystems.

4. The system of claim 1, wherein the ground coupling device includes:

a fastener channel defined by the pluggable terminal block chassis;

a ground contact that is located in the fastener channel and that is coupled to the computing device ground sub-connector; and a fastener device that is configured to secure the grounding wire in the fastener channel in engagement with the ground contact.

5. The system of claim 1, wherein the fastener device is a screw.

6. The system of claim 1, wherein the pluggable terminal block chassis is a European-style terminal block chassis.

7. An Information Handling System (IHS), comprising:

a chassis;

a processing system that is housed in the chassis;

a pluggable terminal block connector that is coupled to the processing system and accessible on the surface of the chassis; and a pluggable terminal block including:

a computing device connector that includes a computing device positive power sub-connector, a computing device negative power sub-connector, and a computing device ground sub-connector, and that is connected to the pluggable terminal block connector;

a ground coupling device that is included on the pluggable terminal block chassis, that is coupled to the computing device ground sub-connector, and that is connected to a grounding wire to couple the computing device ground sub-connector to the grounding wire; and a power system connector that is included on the pluggable terminal block and that includes a terminal block positive power contact that is coupled to the computing device positive power sub-connector, and a terminal block negative power contact that is coupled to the computing device negative power sub-connector, wherein the power system connector is coupled to a power system via power cabling having a power cabling connector that includes:

a power cabling connector positive power contact that engages the terminal block positive power contact; and a power cabling connector negative power contact that engages the terminal block negative power contact, wherein the power cabling connector prevents relative movement between the power cabling connector positive power contact and the power cabling connector negative power contact.

8. The IHS of claim 7, wherein the power system connector and the power cabling connector are barrel-style power connectors.

9. The IHS of claim 8, wherein the barrel-style power connectors are secured together using corresponding threaded securing subsystems.

10. The IHS of claim 7, wherein the ground coupling device includes:

a fastener channel defined by the pluggable terminal block chassis;

a ground contact that is located in the fastener channel and that is coupled to the computing device ground sub-connector; and a fastener device that is configured to secure the grounding wire in the fastener channel in engagement with the ground contact.

11. The IHS of claim 7, wherein the fastener device is a screw.

12. The IHS of claim 7, wherein the pluggable terminal block is a European-style terminal block.

13. The IHS of claim 7, wherein the power system connector is provided by a female barrel-style power connector that extends into the pluggable terminal block and that is not configured to secure the power cabling connector to the pluggable terminal block.

14. A method for preventing short circuits with a pluggable terminal block, comprising:

connecting, by a computing device positive power sub-connector and a computing device negative power sub-connector included in a computing device connector on a pluggable terminal block, to a pluggable terminal block connector on a computing device;

connecting, by a ground coupling device that is included on the pluggable terminal block and that is coupled to a computing device ground sub-connector, to a grounding wire to couple the computing device ground sub-connector to the grounding wire; and coupling, by a power system connector that is included on the pluggable terminal block and that includes a terminal block positive power contact that is coupled to the computing device positive power sub-connector and a terminal block negative power contact that is coupled to the computing device negative power sub-connector, to a power system via power cabling having a power cabling connector by:

engaging, by the terminal block positive power contact when the power cabling connector is connected to the power system connector, with a power cabling connector positive power contact on the power cabling connector; and engaging, by the terminal block negative power contact when the power cabling connector is connected to the power system connector, with a power cabling connector negative power contact on the power cabling connector, wherein the power cabling connector prevents relative movement between the power cabling connector positive power contact and the power cabling connector negative power contact when the power cabling connector is connected to the power system connector.

15. The method of claim 14, wherein the power system connector and the power cabling connector are barrel-style power connectors.

16. The method of claim 15, wherein the barrel-style power connectors are secured together using corresponding threaded securing subsystems.

17. The method of claim 14, wherein the ground coupling device includes:

a fastener channel defined by the pluggable terminal block;

a ground contact that is located in the fastener channel and that is coupled to the computing device ground subconnector; and a fastener device that secures the grounding wire in the fastener channel in engagement with the ground contact.

18. The method of claim 14, wherein the fastener device is a screw.

19. The method of claim 14, wherein the pluggable terminal block is a European-style terminal block.

20. The method of claim 14, wherein the power system connector is provided by a female barrel-style power connector that extends into the pluggable terminal block and that is not configured to secure the power cabling connector to the pluggable terminal block.

* * * * *